(12) United States Patent
Shimadzu

(10) Patent No.: US 10,950,113 B2
(45) Date of Patent: Mar. 16, 2021

(54) ALARM DEVICE

(71) Applicant: HOCHIKI Corporation, Tokyo (JP)

(72) Inventor: Tomohiko Shimadzu, Tokyo (JP)

(73) Assignee: Hochiki Corporation, Tokyo (JP)

( * ) Notice: Subject to any disclaimer, the term of this patent is extended or adjusted under 35 U.S.C. 154(b) by 0 days.

(21) Appl. No.: 16/520,973

(22) Filed: Jul. 24, 2019

(65) Prior Publication Data

US 2020/0160688 A1 May 21, 2020

Related U.S. Application Data

(63) Continuation-in-part of application No. PCT/JP2018/002167, filed on Jan. 24, 2018.

(30) Foreign Application Priority Data

Jan. 26, 2017 (JP) .............................. JP2017-012263

(51) Int. Cl.
*G08B 17/10* (2006.01)
*G08B 21/12* (2006.01)
(Continued)

(52) U.S. Cl.
CPC .............. *G08B 21/12* (2013.01); *G01N 21/01* (2013.01); *G01N 21/534* (2013.01); *G08B 17/107* (2013.01)

(58) Field of Classification Search
CPC ...... G08B 21/12; G08B 17/107; G08B 17/10; G08B 21/14; G08B 17/00; G08B 21/182;
(Continued)

(56) References Cited

U.S. PATENT DOCUMENTS 4,124,298 A 11/1978 Steele
4,584,485 A * 4/1986 Powers ................ G08B 17/113
250/239

(Continued)

FOREIGN PATENT DOCUMENTS

CA 2123155 A1 11/1995
JP H04160697 A 6/1992
(Continued)

OTHER PUBLICATIONS

PCT, "Written Opinion of the International Searching Authority Regarding International Application No. PCT/JP2018/002167", dated Mar. 6, 2018, pp. 4 Published in: WO.
(Continued)

*Primary Examiner* — Anh V La
(74) *Attorney, Agent, or Firm* — Neugeboren O'Dowd PC

(57) ABSTRACT

A detection unit that detects smoke contained in a gas by radiating detection light toward a detection space for detecting smoke, and an inner labyrinth for inhibiting ambient light from entering the detection space, the inner labyrinth being provided to cover an outer edge of the detection space are included, the detection unit includes a light emitting unit that radiates the detection light and a light receiving unit that receives the detection light radiated by the light emitting unit, and at least a part of a side surface of the inner labyrinth on a side of the detection space is formed in a flat shape capable of inhibiting the detection light reflected by the inner labyrinth from entering a field of view RV of the light receiving unit in the detection space.

5 Claims, 22 Drawing Sheets

(51) Int. Cl.
*G01N 21/01* (2006.01)
*G01N 21/53* (2006.01)
*G08B 17/107* (2006.01)

(58) Field of Classification Search
CPC .... G08B 17/117; G08B 17/103; G01N 21/01; G01N 21/534
USPC ............ 340/628, 632, 630, 573.1, 578
See application file for complete search history.

(56) References Cited

U.S. PATENT DOCUMENTS

| | | | |
|---|---|---|---|
| 6,057,778 A * | 5/2000 | Davidson | G08B 17/107 340/691.1 |
| 2003/0209670 A1 * | 11/2003 | Chang | G08B 17/107 250/343 |
| 2013/0176131 A1 * | 7/2013 | Pichard | G01N 21/53 340/630 |
| 2017/0184447 A1 * | 6/2017 | Matsunami | G01N 15/1459 |
| 2018/0149581 A1 * | 5/2018 | Lo | G08B 17/107 |

FOREIGN PATENT DOCUMENTS

| | | |
|---|---|---|
| JP | 2010039936 A | 2/2010 |
| WO | 2009100804 A1 | 8/2009 |
| WO | 2017152163 a1 | 9/2017 |

OTHER PUBLICATIONS

Seisdedos, Marta, "Extended European Search Report Regarding Application No. 18744450.0", dated Jul. 31, 2020, pp. 9 Published in: EP.

* cited by examiner

ALARM DEVICE

PRIORITY AND CROSS REFERENCE TO RELATED APPLICATIONS

The present Application for Patent is a Continuation of International Patent Application No. PCT/JP2018/002167 entitled "ALARM DEVICE" and filed on Jan. 24, 2018, pending, which claims priority to Japanese Patent Application No. 2017-012263 entitled "ALARM DEVICE" filed on Jan. 26, 2017 and assigned to the assignee hereof and hereby expressly incorporated by reference herein.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD OF THE INVENTION

The present invention relates to an alarm device.

BACKGROUND OF THE INVENTION

Conventionally, there has been a known alarm installed on an installation surface of a monitored area to detect smoke in the monitored area and issue a warning (for example, Patent Document 1). This alarm includes a casing, a detection unit, and a circuit unit. Among these components, the casing accommodates the detection unit and the circuit unit, and an opening for allowing smoke in the monitored area to flow into the casing is provided on a side wall of the casing. In addition, the detection unit detects smoke and includes a plurality of labyrinth walls, a light emitting unit, and a light receiving unit. Here, the plurality of labyrinth walls covers a space for detecting smoke (hereinafter referred to as a "detection space"), a side surface of at least one or more labyrinth walls on a detection space side is formed in a non-flat shape, and the labyrinth walls are provided with a gap therebetween. In addition, the light emitting unit radiates light toward the detection space. In addition, when light radiated from the light emitting unit is scattered by particles of smoke flowing into the detection space, the light receiving unit receives the scattered light. In addition, the circuit unit includes a control unit that controls each operation of the alarm. Further, when the amount of light received by the light receiving unit exceeds a predetermined threshold, the circuit unit determines that a fire has broken out in the monitored area.

SUMMARY OF THE INVENTION

Technical Problem

In a conventional alarm, depending on the shapes and installation positions of the plurality of labyrinth walls, light reflected by a portion of the plurality of labyrinth walls on which light is directly incident from the light emitting unit easily enters a field of view of the light receiving unit in the detection space, and thus there is a concern that the amount of light received by the light receiving unit may become excessive.

Therefore, there is room for improvement from a viewpoint of maintaining detection accuracy of smoke.

It is an object of the present invention to solve the problems of the above-mentioned prior arts.

One aspect of the present invention provides an alarm device comprises a detection unit that detects a substance to be detected contained in a gas by radiating detection light toward a detection space for detecting the substance to be detected; and a light shielding unit that inhibits ambient light from entering the detection space, the light shielding unit being provided to cover an outer edge of the detection space, wherein the detection unit includes a light emitting unit that radiates the detection light and a light receiving unit that receives the detection light radiated by the light emitting unit, and at least a part of a side surface of the light shielding unit on a side of the detection space is formed in a flat shape capable of inhibiting the detection light reflected by the light shielding unit from entering a field of view of the light receiving unit in the detection space.

Hereinafter, an embodiment of an alarm device according to the invention will be described in detail with reference to drawings. However, the invention is not limited by this embodiment.

DETAILED DESCRIPTION

First, a basic concept of the embodiment will be described. The embodiment generally relates to an alarm device attached to an installation surface of an installation object, and relates to an alarm device having an attachment surface facing the installation surface. Here, the "alarm device" is an apparatus that issues a warning, specifically is an apparatus that performs detection, reporting, or a warning about a substance to be detected contained in a gas in a monitored area, and corresponds to, for example, a concept including not only a gas alarm or a fire alarm (smoke alarm) having a reporting function or a warning function in addition to a detection function, but also a gas detector, a fire detector (smoke detector), etc. having only at least a part of a detection function, a reporting function, or a warning function with regard to a substance to be detected. The "monitored area" is an area to be monitored, specifically is an area in which the alarm device is installed, and corresponds to, for example, a concept including an area in a house (for example, a room), an area in a building other than the house, etc. In addition, the "installation object" is an object on which the alarm device is installed, and examples thereof include a ceiling, a wall, etc. in the monitored area. In addition, the "installation surface" is a surface of the installation object on which the alarm device is installed, and examples thereof include a surface of the ceiling on the monitored area side (that is, a lower surface of the ceiling), a surface of the wall on the monitored area side (that is, an interior side of the wall), etc. In addition, the "attachment surface" is a surface provided on the alarm device, and specifically is a surface attached to the installation surface in a state of facing the installation surface. In addition, the "substance to be detected" is a substance corresponding to a detection target, specifically is a substance contained in a gas, and corresponds to, for example, a concept including carbon monoxide, smoke, etc. in the gas.

In the following embodiment, a description will be given of a case in which the "substance to be detected" is "smoke", and the "alarm device" is a "fire alarm (smoke alarm)" that issues a warning on the basis of scattered light due to smoke, and the "monitoring area" is a "room as an area in a house". In addition, as described above, examples of the "installation object" include the "ceiling", the "wall", etc., and a case in which the "installation object" is the "wall" will be appropriately brought up and described while a case in which the "installation object" is the "ceiling" is illustrated below.

Configuration

Figure 1:
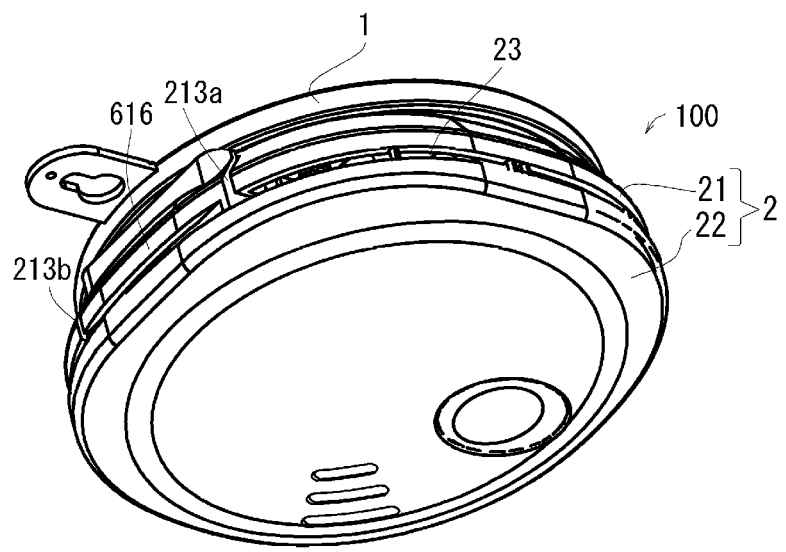
FIG. 1 is a perspective view of an alarm device according to the present embodiment.
Figure 2:
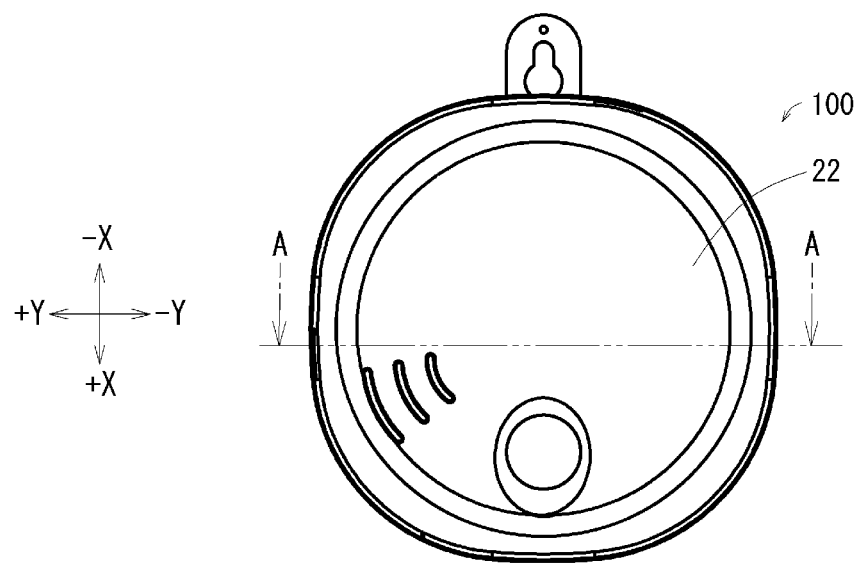
FIG. 2 is a bottom view of the alarm device.
Figure 3:
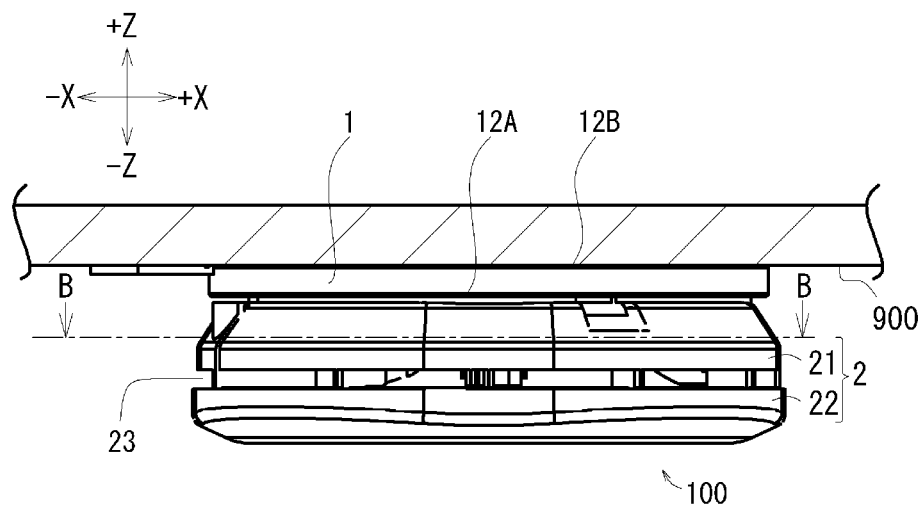
FIG. 3 is a side view of the alarm device.
Figure 4:
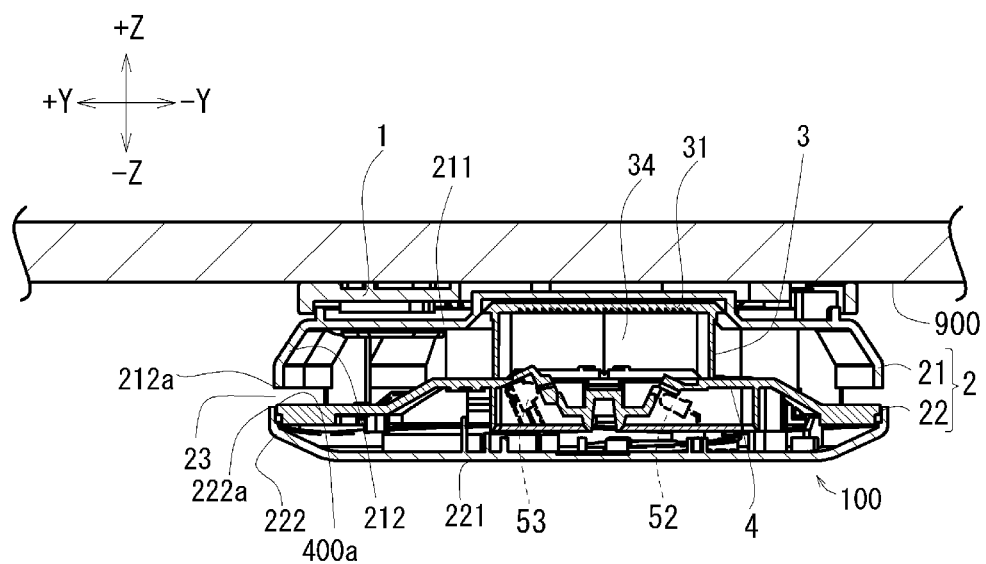
FIG. 4 is a cross-sectional view taken along A-A line of FIG. 2.
Figure 5:
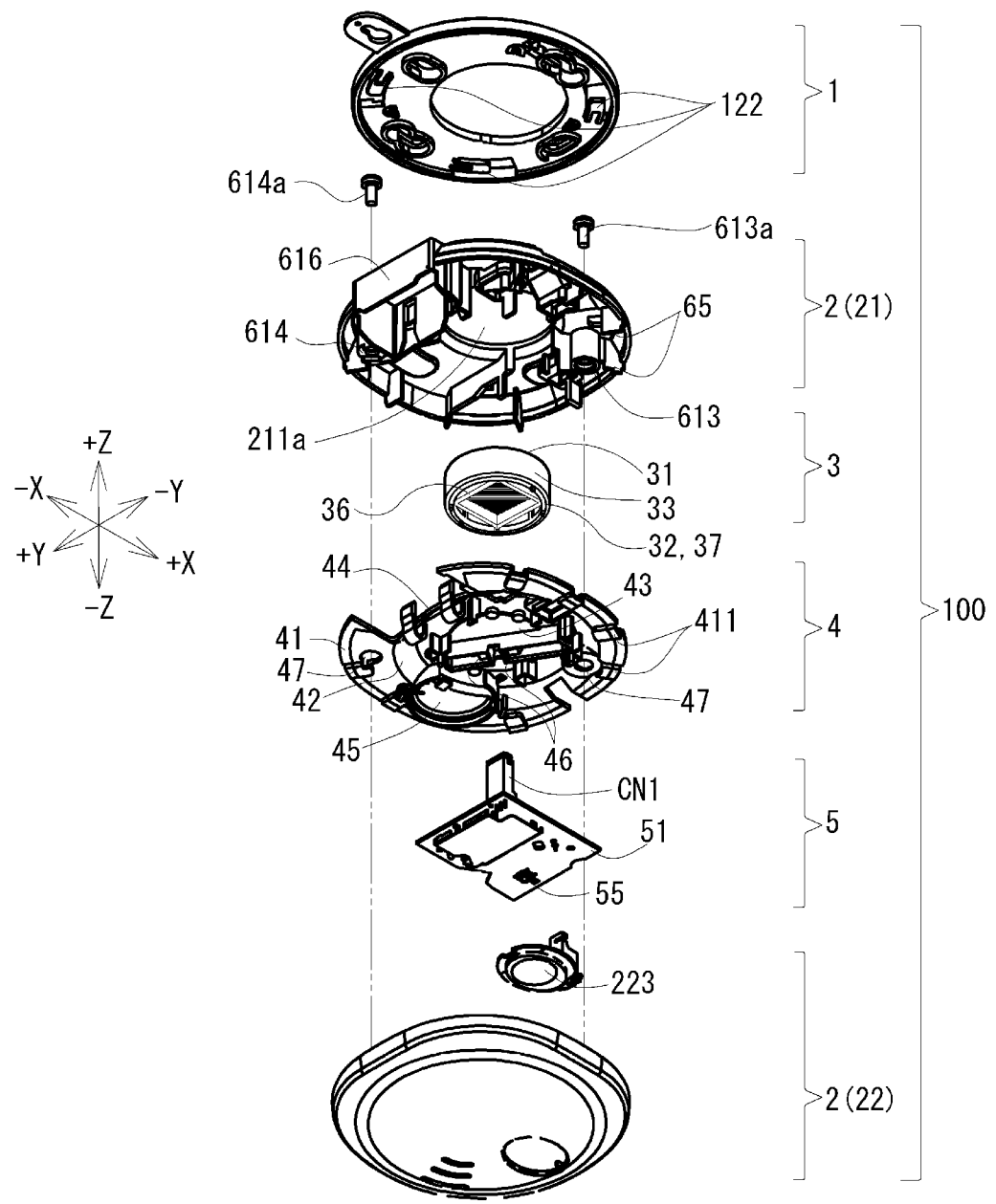
FIG. 5 is an exploded perspective view of the alarm device viewed from a lower side.
Figure 6:
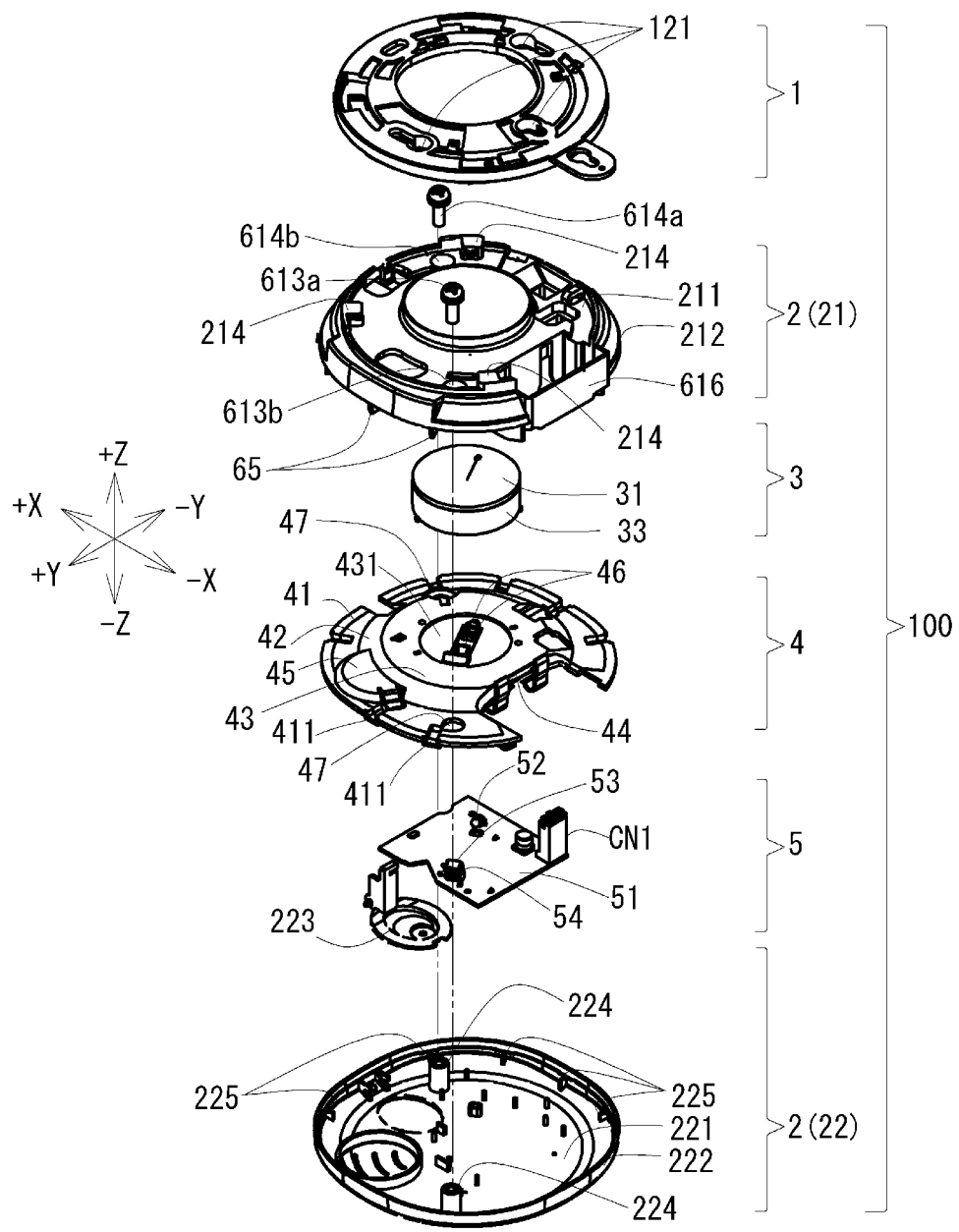
FIG. 6 is an exploded perspective view of the alarm device viewed from an upper side.

First, a description will be given of a configuration of the alarm device according to the present embodiment. FIG. 1 is a perspective view of an alarm device according to the present embodiment, FIG. 2 is a bottom view of the alarm device, FIG. 3 is a side view of the alarm device, FIG. 4 is a cross-sectional view taken along A-A line of FIG. 2, FIG. 5 is an exploded perspective view of the alarm device viewed from a lower side, and FIG. 6 is an exploded perspective view of the alarm device viewed from an upper side. In the following description, X-Y-Z directions illustrated in the respective drawings are directions orthogonal to one another. Specifically, the Z direction is a vertical direction (that is, a direction in which gravity acts), and the X direction and the Y direction are horizontal directions orthogonal to the vertical direction. For example, the Z direction is referred to as a height direction, a +Z direction is referred to as an upper side (plane), and a −Z direction is referred to as a lower side (bottom surface). In addition, in an illustrated alarm device 100, terms related to the "X-Y-Z directions" below are convenient expressions for describing a relative positional relationship (or direction) of respective components. In the following description, with reference to a center position of a detection space 34 of a case 2 of FIG. 4, a direction away from the detection space 34 is referred to as an "outer side", and a direction approaching the detection space 34 is referred to as an "inner side".

The alarm device 100 illustrated in each of these figures is an alarm unit that detects smoke corresponding to a substance to be detected contained in a gas and issues a warning. Specifically, as illustrated in FIG. 3, the alarm device 100 may be used by being attached to an installation surface 900 corresponding to a surface on a lower side (−Z direction) (that is, a lower surface) of the ceiling in the monitored area or an installation surface (not illustrated) corresponding to a surface on a monitored area side of the wall in the monitored area (that is, the interior side of the wall) (hereinafter a wall installation surface). Specifically, the alarm device 100 includes an attachment base 1, a case 2, a detector cover 3 of FIG. 5, a detector body 4, and a circuit unit 5. Hereinafter, a description will be given of a case in which the installation surface 900 spreads in a direction along an XY plane (that is, the horizontal direction), and the "wall installation surface" (not illustrated) spreads in a direction orthogonal to the installation surface 900 (that is, the vertical direction). Hereinafter, after describing an overall configuration of the alarm device 100, details of each configuration will be described.

Configuration—Attachment Base

Figure 7:
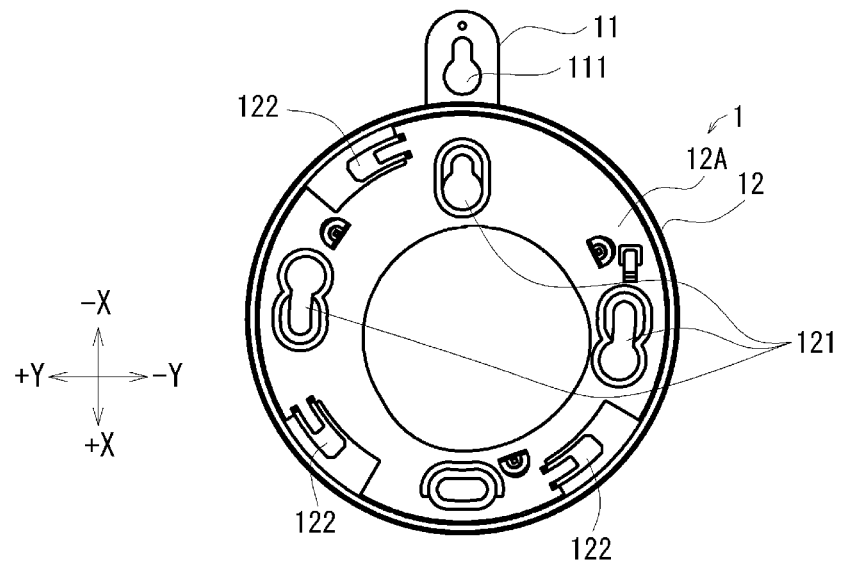
FIG. 7 is a bottom view of an attachment base.
Figure 8:
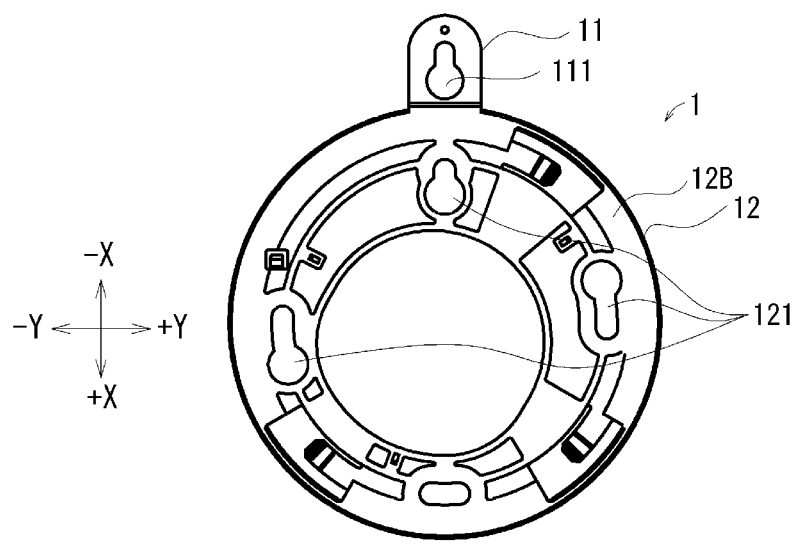
FIG. 8 is a plan view of the attachment base.

First, FIG. 7 is a bottom view of the attachment base, and FIG. 8 is a plan view of the attachment base. The attachment base 1 illustrated in FIG. 3 is an attachment unit that attaches the case 2 to the installation surface 900 or the "wall installation surface" (not illustrated), specifically is used between the case 2 and the installation surface 900 or the "wall installation surface" (not illustrated), and more specifically includes an attachment hook 11 and a main body 12 of FIG. 7.

Configuration—Attachment Base—Attachment Hook

The attachment hook 11 of FIG. 7 is used to attach (that is, install) the attachment base 1 to the installation surface 900 or the "wall installation surface" (not illustrated), specifically is a protruding piece protruding from the main body 12, and includes, for example, a screw hole 111. The screw hole 111 is a hole into which an attachment screw (not illustrated) for attaching the attachment base 1 is inserted. Further, by continuously inserting the attachment screw into the screw hole 111 and the installation surface 900 or the "wall installation surface" (not illustrated), the attachment base 1 can be attached to the installation surface 900 or the "wall installation surface" (not illustrated).

Configuration—Attachment Base—Main Body

The main body 12 of FIG. 7 is a main body of the attachment base 1. For example, the main body 12 spreads in a direction along the XY plane, has a disc shape having a predetermined diameter, and is formed integrally with the attachment hook 11 and made of resin. More specifically, the main body 12 includes a case-side facing surface 12A and an installation surface-side facing surface 12B of FIG. 8. As illustrated in FIG. 3, the case-side facing surface 12A of FIG. 7 is a surface to which the case 2 is attached in a state of facing the case 2, and the installation surface-side facing surface 12B is an attachment surface attached to the installation surface 900 (that is, an attachment surface spreading in the direction along the XY plane) in a state of facing the installation surface 900. In addition, as illustrated in FIG. 7, the main body 12 includes a screw hole 121 and an engagement portion 122. The screw hole 121 is a hole into which an attachment screw (not illustrated) for attaching the attachment base 1 to the installation surface 900 is inserted. Further, by continuously inserting the attachment screw into the screw hole 121 and the installation surface 900, the attachment base 1 can be attached to the installation surface 900. In addition, the engagement portion 122 is the attachment unit to which the case 2 of FIG. 3 is attached, and specifically is engaged with an engagement portion 214 of a back case 21 of FIG. 6 described below. An outer diameter of such a main body 12 can be arbitrarily set. For example, a description will be given below on the assumption that the outer diameter is set to a similar size (for example, about 10 cm) to that of an existing attachment base.

Configuration—Case

Next, the case 2 of FIG. 3 is an accommodating unit that accommodates the detector cover 3, the detector body 4, and the circuit unit 5 (hereinafter objects to be accommodated) of FIG. 5, specifically is attached to the installation surface 900 through the attachment base 1, and more specifically includes the back case 21 and a front case 22 of FIG. 5.

Configuration—Case—Back Case

Figure 9:
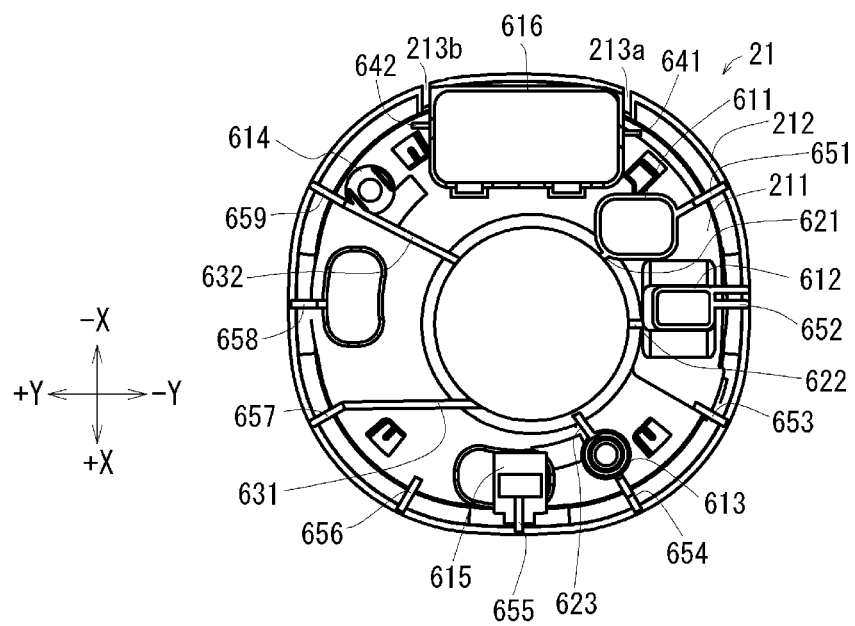
FIG. 9 is a bottom view of a back case.
Figure 10:
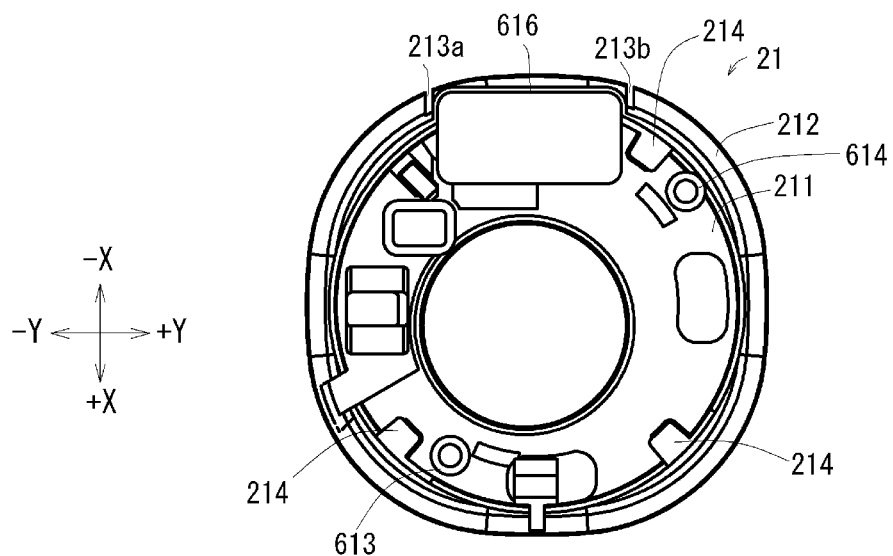
FIG. 10 is a plan view of the back case.
Figure 11:
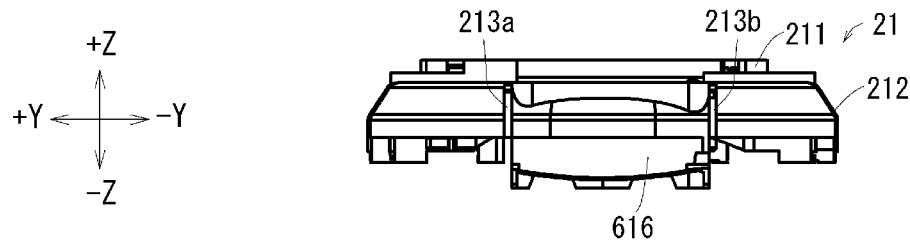
FIG. 11 is a front view of the back case.

FIG. 9 is a bottom view of the back case, FIG. 10 is a plan view of the back case, and FIG. 11 is a front view of the back case. As illustrated in FIG. 5, the back case 21 of these respective figures is a first accommodating unit that accommodates the "object to be accommodated" from the attachment base 1 side (that is, the upper side (+Z direction)), and forms a gap as an outer inflow opening 23 of FIG. 3 described below between the front case 22 and the back case 21 by being combined with the front case 22. In addition, the back case 21 is an external guiding unit that guides gas moving outside the case 2 of FIG. 4 (including gas moving along the installation surface 900) to the inside of the case 2 and an internal guiding unit that guides gas moving inside the case 2 to the detection space 34 described below, and specifically forms a flow path of gas between the detector body 4 and the back case 21.

For example, the back case 21 of FIG. 9 to FIG. 11 spreads in the direction along the XY plane, has a disc shape whose diameter is larger than that of the attachment base 1, and is integrally formed as a whole and made of resin (including an "inner member of the back case 21" described below). More specifically, the back case 21 includes a back case-side facing wall 211 and a back case-side outer circumferential wall 212. The back case-side facing wall 211 of FIG. 4 forms a part that spreads in the direction along the XY plane in back case 21, that is, faces the attachment base 1, and includes a guiding recess 211a of FIG. 5. The guiding recess 211a is a guiding unit that guides gas with respect to the detection space 34 of FIG. 4. In addition, the back case-side outer circumferential wall 212 is a first outer wall forming a part (outer wall) that extends in a height direction (Z direction) in the back case 21, and extends toward the lower side (−Z direction) while spreading outward from an outer edge of the back case-side facing wall 211.

In addition, more specifically, the back case 21 of FIG. 9 includes component cases 611 to 616, short fins 621 to 623, long fins 631 and 632, prevention pieces 641 and 642, and ribs 651 to 659 (hereinafter "the component cases 611 to 616, the short fins 621 to 623, the long fins 631 and 632, the prevention pieces 641 and 642, and the ribs 651 to 659" are collectively referred to as "inner members of the back case 21"). First, each of the component cases 611 to 616 is an accommodating unit that accommodates a component included in the alarm device 100, and specifically has an accommodation wall that partitions a component accommodation space corresponding to a space for accommodating the component. In addition, each of the component cases 611 to 616 (specifically, accommodation walls of the component cases 611 to 616) is a guiding unit that guides gas to the detection space 34 of FIG. 4, and is provided in consideration of an arrangement place of the component, etc. to function as the guiding unit. In addition, the short fins 621 to 623 are a guiding unit that guide gas to the detection space 34 of FIG. 4, and specifically are protruding pieces protruding and extending from the component cases 611 to 613 of FIG. 9.

In addition, the long fins 631 and 632 are the guiding unit that guide gas to the detection space 34 of FIG. 4, specifically are pieces extending from ribs 657 and 659 of FIG. 9 described below and are sufficiently longer than the short fin 621. In addition, the prevention pieces 641 and 642 are the guiding unit that guide gas to the detection space 34 of FIG. 4 and a prevention unit that prevents dust contained in a gas flowing into the inside through slits 213a and 213b of FIG. 9 described below from intruding into the detection space 34 of FIG. 4. The ribs 651 to 659 of FIG. 9 are the guiding unit that guide gas to the detection space 34, a reinforcing unit that reinforce the back case 21, and a position determination unit that determines a relative positional relationship in the height direction (Z direction) between the front case 22 and the back case 21 of FIG. 6 (that is, a width of the outer inflow opening 23 of FIG. 3). Specifically, the ribs 651 to 659 partition the inside of the outer inflow opening 23 and the case 2 of FIG. 3, and are provided, for example, on the back case-side facing wall 211. The "width of the outer inflow opening 23" indicates a distance from an upper end to a lower end in the outer inflow opening 23. In addition, in the following description, when the ribs 651 to 659 may not be distinguished from one another, the ribs 651 to 659 are collectively referred to as a "rib 65" as appropriate.

Configuration—Case—Front Case

Figure 12:
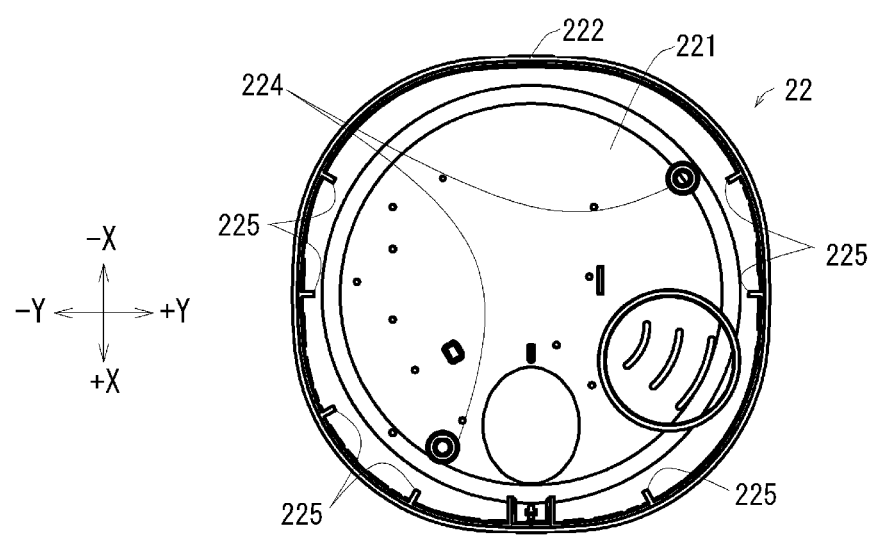
FIG. 12 is a plan view of a front case.
Figure 13:
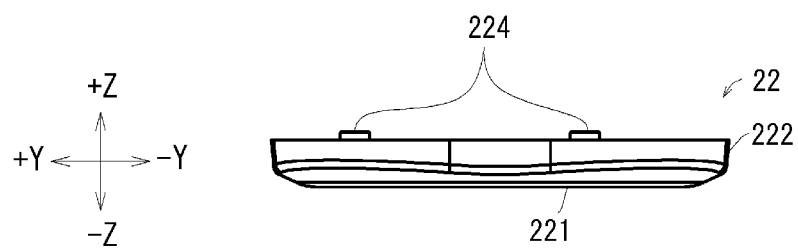
FIG. 13 is a front view of the front case.

FIG. 12 is a plan view of the front case, and FIG. 13 is a front view of the front case. As illustrated in FIG. 5, the front case 22 of these respective figures is a second accommodating unit that accommodates the "object to be accommodated" from the opposite side from the attachment base 1 side (that is, lower side (−Z direction)) with the "object to be accommodated" interposed therebetween, and specifically forms a gap as the outer inflow opening 23 of FIG. 3 between the back case 21 and the front case 22 by being combined with the back case 21. Here, the "outer inflow opening" 23 is an inflow unit that allows gas outside the case 2 to flow into the case 2, particularly a first inflow opening that allows gas moving along the installation surface 900 on the outside of the case 2 to flow into the case 2, and is a gap formed between the back case 21 and the front case 22 of the case 2 to extend in the direction along the XY plane. A width of the outer inflow opening 23 can be arbitrarily set in consideration of prevention of intrusion of dust, ambient light, or a finger of a user, an impression on the user given by an appearance of the alarm device 100, etc. Here, for example, a description will be given below on the assumption that the width is set to 3 to 5 (mm). In addition, the front case 22 is an external guiding unit that guides gas moving outside the case 2 of FIG. 4 (including gas moving along the installation surface 900) to the inside of the case 2.

For example, the front case 22 of FIG. 12 and FIG. 13 spreads in the direction along the XY plane, has a disc shape whose diameter is larger than that of the back case 21, is integrally formed as a whole and made of resin, and more specifically includes a front case-side exposed wall 221 and a front case-side outer peripheral wall 222. First, the front case-side exposed wall 221 forms a part spreading in the direction along the XY plane in the front case 22, that is, is exposed to be visually recognized mainly by the user. In addition, the front case-side outer peripheral wall 222 of FIG. 4 is a second outer wall that forms a part (outer wall) extending in the height direction (Z direction) in the front case 22, and extends toward the upper side (+Z direction) while spreading outward from an outer edge of the front case-side exposed wall 221.

In addition, more specifically, the front case 22 of FIG. 6 includes a push button 223, a screw boss 224, and a support 225. First, the push button 223 is an operation unit that operates the alarm device 100, and specifically is used to push a switch 55 of the circuit unit 5 of FIG. 5 described below from the outside of the front case 22. Further, the screw boss 224 of FIG. 6 is a position determination unit that determines a relative positional relationship in the height direction (Z direction) between the front case 22 and the back case 21 (that is, the width of the outer inflow opening 23 of FIG. 3), and a fixing unit that mutually fixes the front case 22 and the back case 21 of FIG. 6. Specifically, the screw boss 224 is provided on a surface on the upper side (+Z) in the front case-side exposed wall 221. For example, the screw boss 224 is provided with a predetermined screw hole and has a pillar shape erected in the height direction (Z direction). In addition, the support 225 is a support unit that supports the detector body 4 and specifically corresponds to a plurality of protruding pieces provided on the front case-side outer peripheral wall 222 side on a surface of the front case-side exposed wall 221 on the upper side (+Z).

Configuration—Detector Cover

Figure 14:
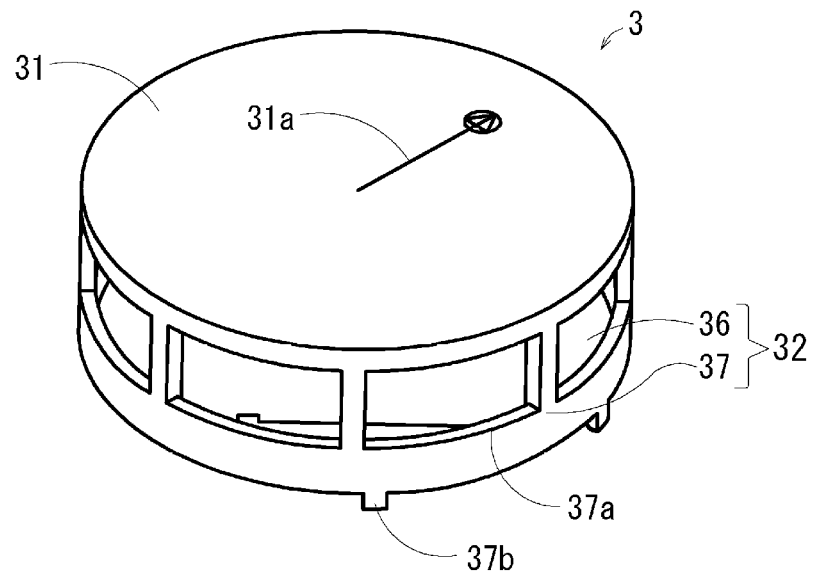
FIG. 14 is a perspective view of a detector cover (insect screen is not illustrated) viewed from an upper side.
Figure 15:
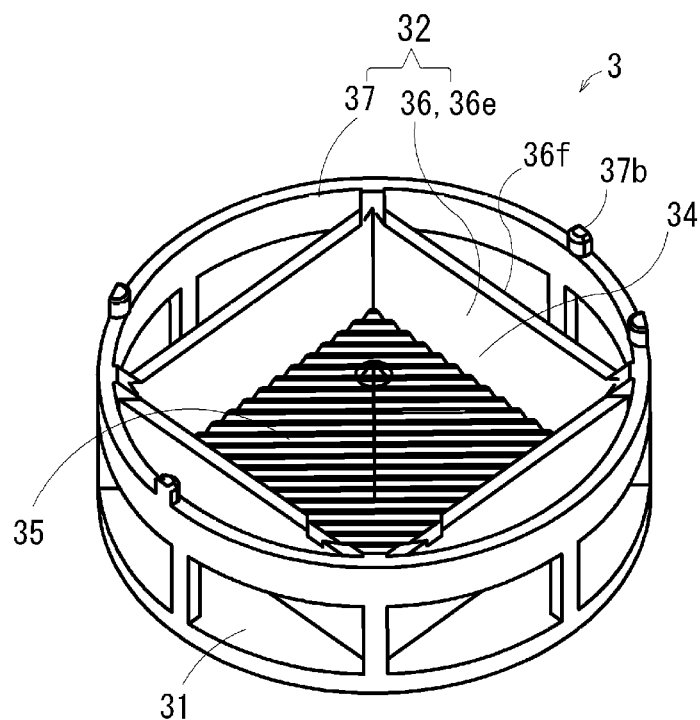
FIG. 15 is a perspective view of the detector cover (insect screen is not illustrated) viewed from a lower side.
Figure 16:
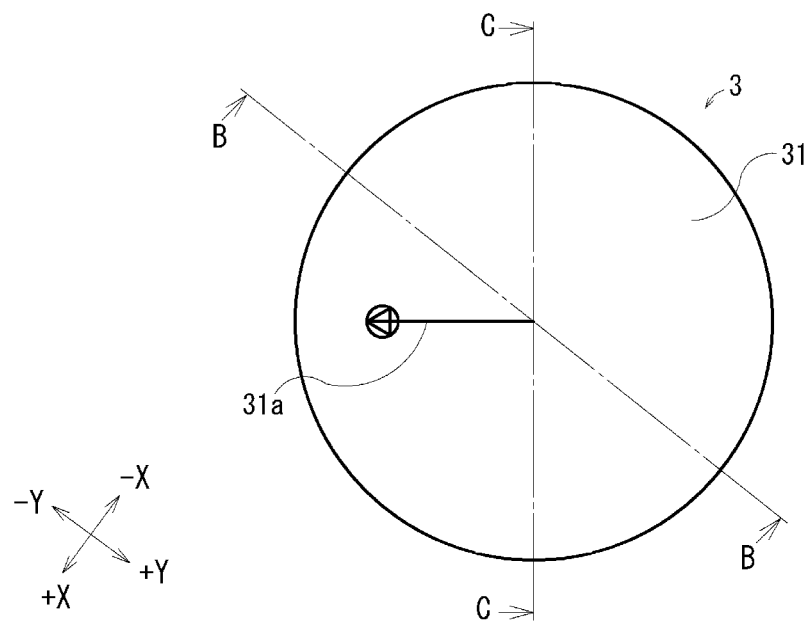
FIG. 16 is a plan view of the detector cover (insect screen is not illustrated).
Figure 17:
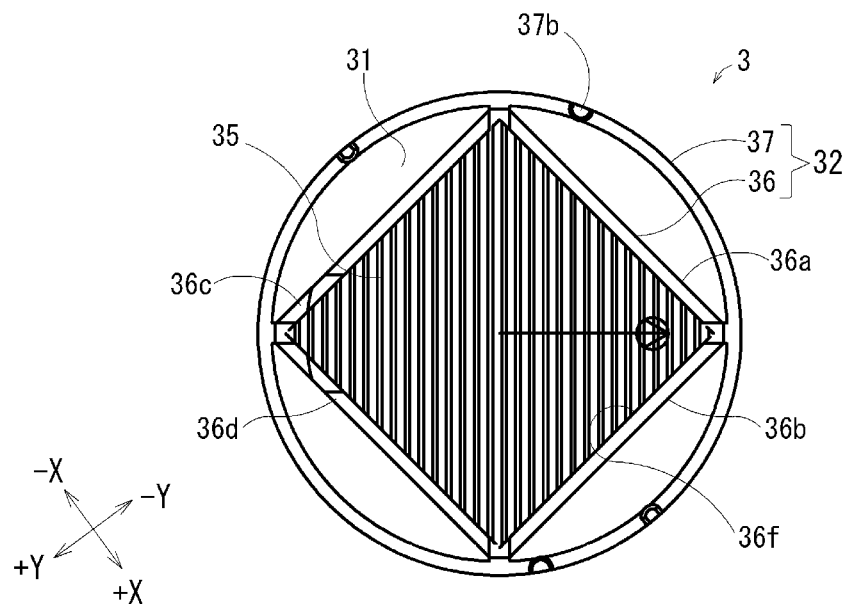
FIG. 17 is a bottom view of the detector cover (insect screen is not illustrated).
Figure 18:
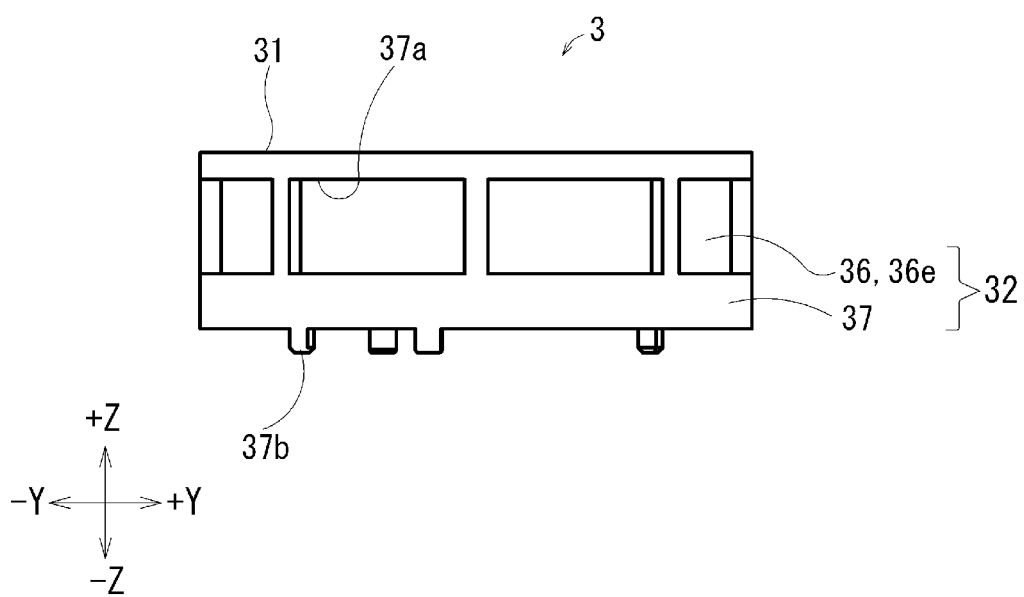
FIG. 18 is a side view of the detector cover (insect screen is not illustrated).
Figure 19:
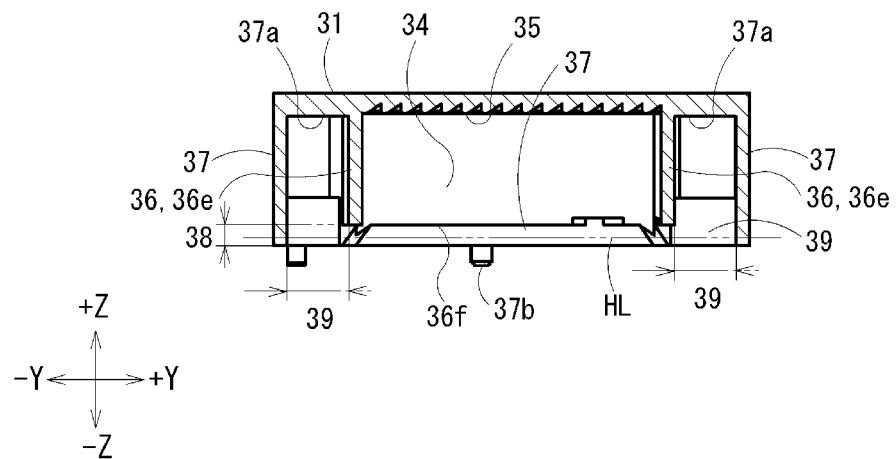
FIG. 19 is a cross-sectional view taken along B-B line of FIG. 16.
Figure 20:
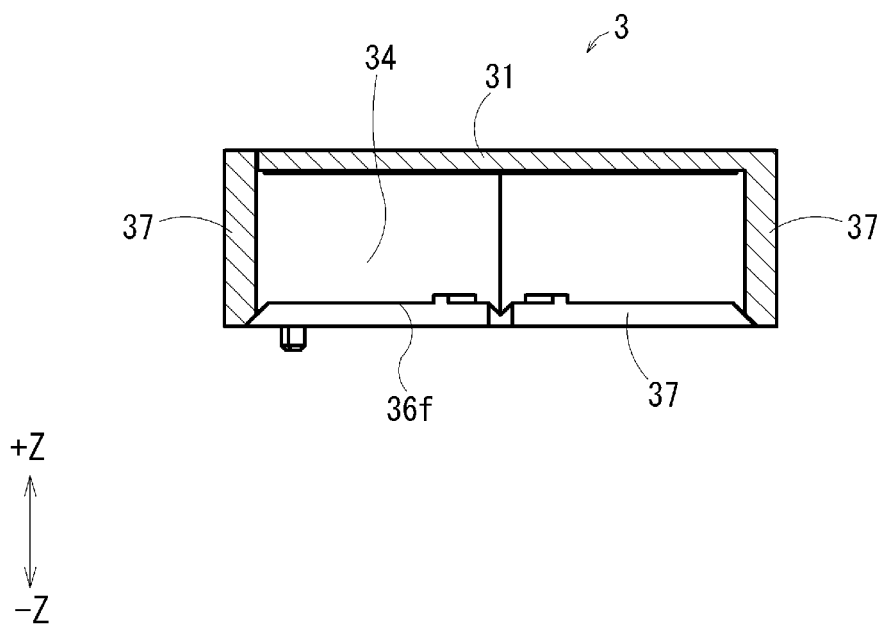
FIG. 20 is a cross-sectional view taken along C-C line of FIG. 16.

Next, FIG. 14 is a perspective view of the detector cover (insect screen is not illustrated) viewed from the upper side, and FIG. 15 is a perspective view of the detector cover (insect screen is not illustrated) viewed from the lower side. FIG. 16 is a plan view of the detector cover (insect screen is not illustrated), FIG. 17 is a bottom view of the detector cover (insect screen is not illustrated), and FIG. 18 is a side view of the detector cover (insect screen is not illustrated). FIG. 19 is a cross-sectional view taken along B-B line of FIG. 16, and FIG. 20 is a cross-sectional view taken along C-C line of FIG. 16. The detector cover 3 of these respective figures is used to detect smoke using scattered light. As illustrated in FIG. 5, the detector cover 3 is provided between the back case and the detector body 4, and includes a ceiling plate 31, a labyrinth 32, and an insect screen 33. The "detection space" 34 of FIG. 4 is a space for detecting smoke. The ceiling plate 31 is a member that inhibits ambient light from entering the detection space 34. As illustrated in FIG. 14, FIG. 16, and FIG. 18 to FIG. 20, the ceiling plate 31 is formed in a disc shape having a smaller diameter than that of the case 2 and provided to cover an upper outer edge in an outer edge of the detection space 34. In addition, since an upper surface of the ceiling plate 31 has an arrow 31a along a direction in which a light emitting unit 52 and a light receiving unit 53 described below are arranged in parallel, the arrow can be used when the alarm device 100 is assembled. The labyrinth 32 is a member that inhibits ambient light from entering the detection space 34. As illustrated in FIG. 14, FIG. 15, and FIG. 17 to FIG. 20, the labyrinth 32 is provided to cover an outer edge substantially along the height direction (Z direction) in the outer edge of the detection space 34 below the ceiling plate 31. The insect screen 33 is an insect repellent unit that prevents insects, etc. from entering the detection space 34 while allowing outside air to enter the detection space 34 through small holes of the insect screen 33. The insect screen 33 is formed in an annular shape surrounding an outer periphery of the labyrinth 32 (specifically, an outer periphery of an outer labyrinth 37 described below), and has a large number of small holes having sizes at which insects are difficult to intrude on a side surface thereof. Details of the configuration of the detector cover 3 will be described below.

Configuration—Detector Body

Figure 21:
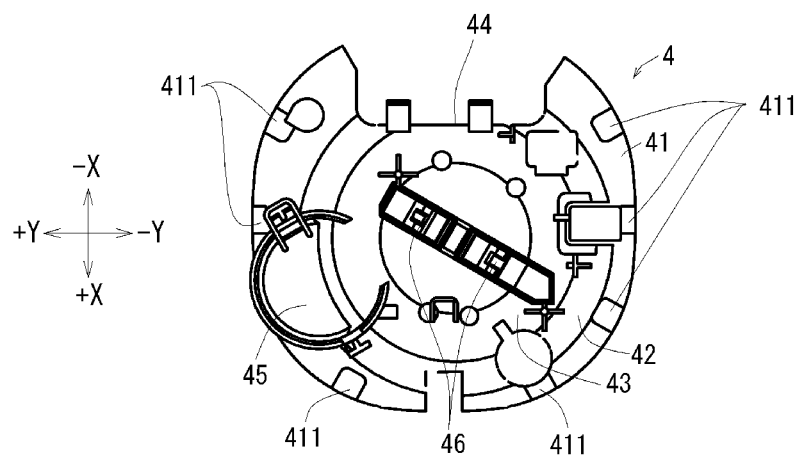
FIG. 21 is a bottom view of a detector body.
Figure 22:
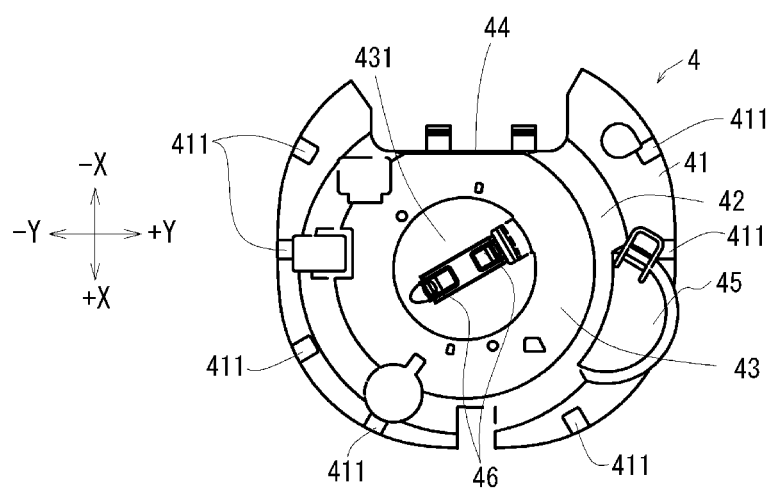
FIG. 22 is a plan view of the detector body.
Figure 23:
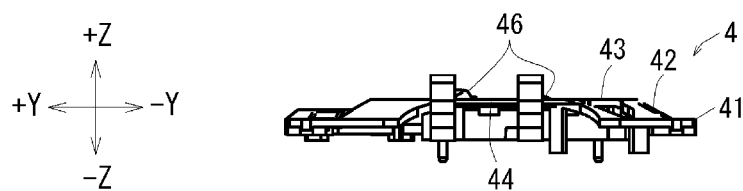
FIG. 23 is a front view of the detector body.

Next, FIG. 21 is a bottom view of the detector body, FIG. 22 is a plan view of the detector body, and FIG. 23 is a front view of the detector body. As illustrated in FIG. 4, the detector body 4 of these respective figures is an arranging unit that arranges the detector cover 3 and a member that inhibits ambient light from entering the detection space 34. Specifically, the detector body 4 forms a flow path of gas between the back case 21 and the detector body 4 after shielding gas flowing into the case 2 from the outer inflow opening 23 so that the gas does not enter between the detector body 4 and the front case 22. For example, the detector body 4 spreads from the detector cover 3 side of FIG. 4 to the outer inflow opening 23 side in the direction along the XY plane, has a diameter larger than that of the ceiling plate 31 of the detector cover 3 and slightly smaller than that of the front case 22 as illustrated in FIG. 6, and has a disc shape, a part of which is cut out. Further, the detector body 4 has a shape in which a part on the inner side bulges from the lower side (−Z direction) toward the upper side (+Z direction), and is integrally formed as a whole and made of resin. The statement "diameter slightly smaller than that of the front case 22" means that the diameter of the detector body 4 is a "diameter" that allows a detector body-side end portion 400a to come into contact with (or approaches) a front case-side end portion 222a from the inside as illustrated in FIG. 4. The "detector body-side end portion" 400a is an outer edge of the detector body 4 and an edge on the outer inflow opening 23 side.

More specifically, the detector body 4 of FIG. 6 includes a flange portion 41, an inclined portion 42, a bulging portion 43, a detector body notch portion 44, a speaker accommodation portion 45, and an element cover 46 of FIG. 21 to FIG. 23. The flange portion 41 is a portion that spreads in the direction along the XY plane on the outer side in the detector body 4, and includes a positioning recess 411. The positioning recess 411 is a positioning unit that positions the rib 65 of the back case 21 with respect to the detector body 4. Specifically, a plurality of positioning recesses 411 is provided on an outer edge of the flange portion 41 and recessed from the upper side (+Z side) to the lower side (−Z side). In addition, the inclined portion 42 is a part continuous from the flange portion 41, and is a part inclined toward the upper side (+Z direction) with respect to the flange portion 41 (direction along the XY plane) to provide the detection space 34 of FIG. 4 above the outer inflow opening 23 (+Z direction). In addition, the bulging portion 43 is a part on which the detector cover 3 is provided and a part which is located above the flange portion 41 (+Z direction), is continuous from the inclined portion 42, and spreads in the direction along the XY plane. An arrangement recess 431 of FIG. 6 is formed on a surface of the bulging portion 43 on the upper side (+Z direction). The arrangement recess 431 is a part in which the detector cover 3 is arranged, specifically is a circular recess, and is a recess having a diameter corresponding to an outer diameter of the detector cover 3. In addition, the detector body notch portion 44 is a part cut out in a shape corresponding to an outer shape of the component case 616 described below to provide the component case 616 to the alarm device 100. In addition, the speaker accommodation portion 45 is a part bulging from the lower side (−Z direction) to the upper side (+Z direction) to correspond to an outer shape of an accommodated speaker (not illustrated) in order to accommodate the speaker between the detector body 4 and the front case 22. In addition, the element cover 46 covers the light emitting unit 52 and the light receiving unit 53 described below in the circuit unit 5 from the upper side (+Z direction) to prevent accumulation of dust on the light emitting unit 52 and the light receiving unit 53, is formed in the arrangement recess 431 in the bulging portion 43, and has an optical path hole for forming an optical path between the light emitting unit 52 and the light receiving unit 53 described below in the circuit unit 5 and the detection space 34 of FIG. 4. In addition, in the embodiment, a shape and an installation position of each part are set so that detection light radiated from the light emitting unit 52 described below is directly incident on an inner labyrinth 36 described below without being directly received by the light receiving unit 53.

Configuration—Circuit Unit

Figure 24:
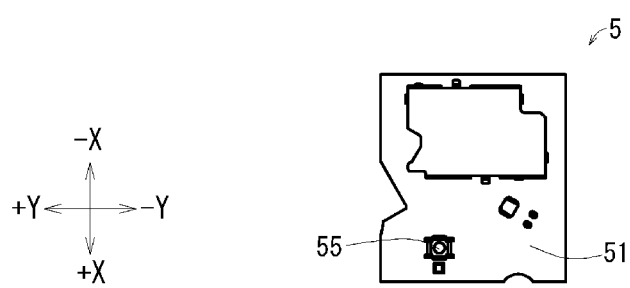
FIG. 24 is a bottom view of a circuit unit.
Figure 25:
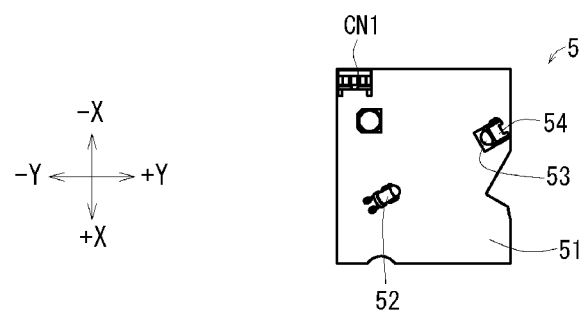
FIG. 25 is a plan view of the circuit unit.
Figure 26:
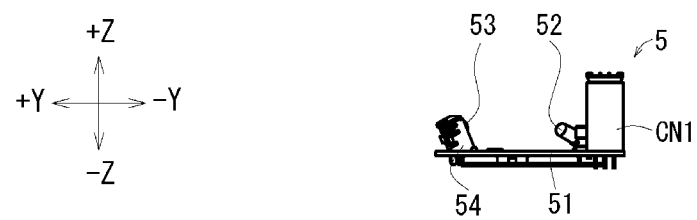
FIG. 26 is a front view of the circuit unit.

Next, FIG. 24 is a bottom view of the circuit unit, FIG. 25 is a plan view of the circuit unit, and FIG. 26 is a front view of the circuit unit. The circuit unit 5 of these respective figures is a circuit unit that forms an electric circuit for issuing a warning, and more specifically includes a circuit board 51, the light emitting unit 52, the light receiving unit 53, a shield 54, the switch 55, a power supply connector CN1, and a control unit (not illustrated). The circuit board 51 is a mounting unit on which each element of the alarm device 100 is mounted. Specifically, a through-hole, a terminal surrounding the through-hole, etc. are provided at predetermined positions so that each element is mounted on a mounting surface on the upper side (+Z direction) (hereinafter an upper mounting surface) or a mounting surface on the lower side (−Z direction) (hereinafter a lower mounting surface) using solder, etc. The light emitting unit 52 is a light emitting unit that radiates detection light. Specifically, as illustrated in FIG. 4, the light emitting unit 52 is an element mounted on the upper mounting surface of the circuit board 51 to be able to emit light toward the detection space 34 provided above the light emitting unit 52 (+Z direction), for example, a light emitting diode. The light receiving unit 53 is a light receiving unit that receives scattered light generated when detection light radiated from the light emitting unit 52 is scattered by particles of smoke flowing into the detection space 34. Specifically, the light receiving unit 53 is an element mounted on the upper mounting surface of the circuit board 51 to be able to receive light from the detection space 34 provided above the light receiving unit 53 (+Z direction), for example, a photodiode. The shield 54 of FIG. 26 is a shielding unit that electromagnetically shields the light receiving unit 53, is a support unit that supports the light receiving unit 53 with respect to the circuit board 51, specifically is a conductive element mounted on the upper mounting surface of the circuit board 51, and is formed of, for example, a metal. The switch 55 of FIG. 24 is an operation unit that operates the alarm device 100, specifically is an element mounted on the lower mounting surface of the circuit board 51, and is, for example, a push switch. The power supply connector CN1 of FIG. 25 is a supply unit that supplies a power supply voltage to the alarm device 100, specifically is used to supply a power supply voltage from a battery (not illustrated) as a power supply, and is mounted on the upper mounting surface of the circuit board 51. The control unit controls each operation of the alarm device 100, and specifically is mounted on the upper mounting surface (or the lower mounting surface) of the circuit board 51. In such a circuit unit 5, the control unit determines that a fire has broken out in the monitored area when the amount of light received by the light receiving unit 53 exceeds a predetermined threshold. The light emitting unit 52 and the light receiving unit 53 correspond to a "detection unit" in claims.

Configuration—Details of Configuration of Detector Cover

Next, details of the configuration of the detector cover 3 will be described. Schemes described below are applied to configurations of the ceiling plate 31 and the labyrinth 32 of the detector cover 3.

Configuration—Details of Configuration of Detector Cover—Ceiling Plate

First, the configuration of the ceiling plate 31 of the detector cover 3 will be described. As illustrated in FIG. 15, FIG. 17, and FIG. 19, a light trap 35 is formed on a side surface of the ceiling plate 31 on the detection space 34 side (a lower surface of the ceiling plate 31 illustrated in FIG. 15). The light trap 35 diffusely reflects light directly or indirectly incident from the light emitting unit 52. As illustrated in FIG. 15, FIG. 17, and FIG. 19, the light trap 35 is formed in a portion corresponding to the detection space 34 on the lower surface of the ceiling plate 31, and specifically is formed so that a portion corresponding to the detection space 34 has a convex-concave shape continuous along the direction in which the light emitting unit 52 and the light receiving unit 53 are arranged in parallel. In this way, since detection light entering from the light emitting unit 52 can be diffusely reflected by the light trap 35, detection light can be attenuated and reflected when compared to a case in which the light trap 35 is not formed on the ceiling plate 31 and incident detection light by the ceiling plate 31 is reflected as it is without being diffusely reflected. Therefore, even when the light receiving unit 53 directly receives detection light reflected by the light trap 35, it is possible to maintain detection accuracy of smoke by the alarm device 100.

Configuration—Details of Configuration of Detector Cover—Labyrinth

Figure 27:
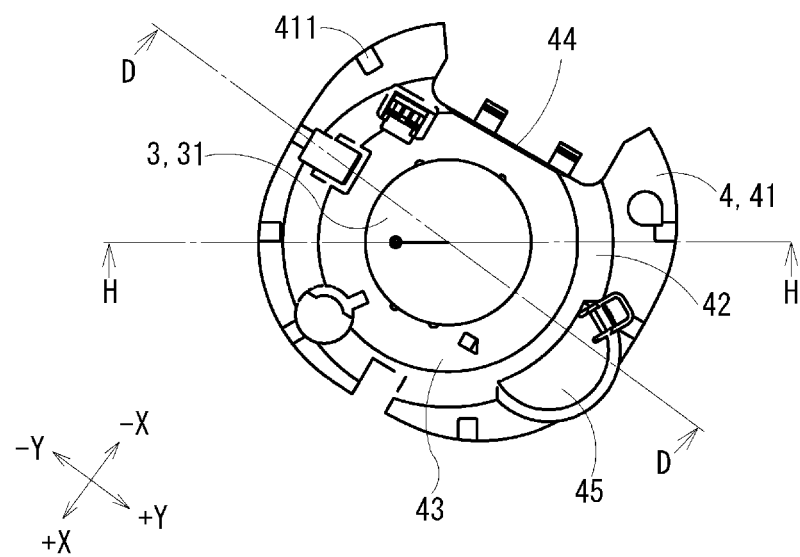
FIG. 27 is a plan view illustrating a state in which the detector cover (insect screen is not illustrated) is attached to the detector body.
Figure 28:
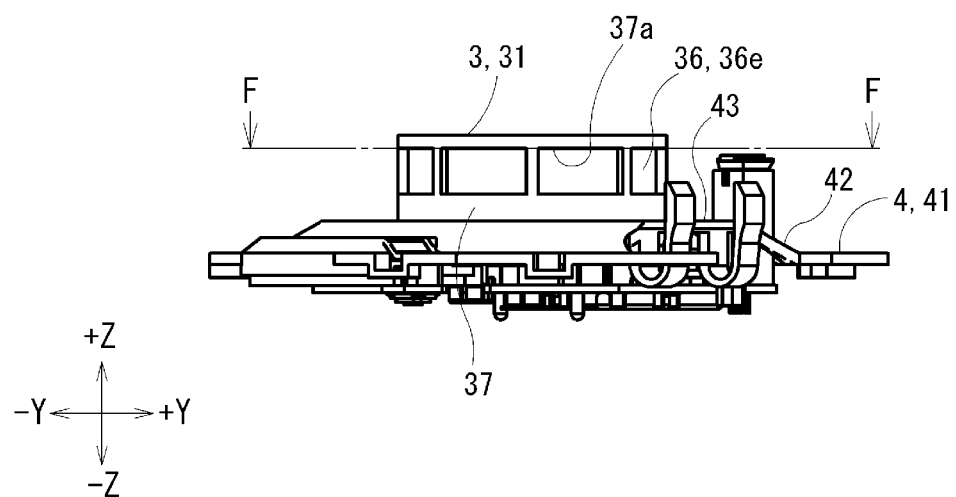
FIG. 28 is a side view illustrating the state in which the detector cover (insect screen is not illustrated) is attached to the detector body.
Figure 29:
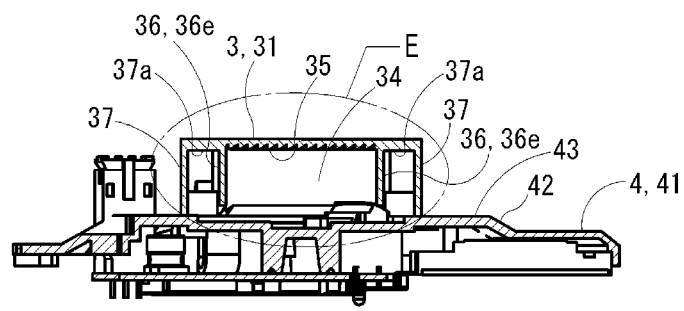
FIG. 29 is a cross-sectional view taken along D-D line of FIG. 27.
Figure 30:
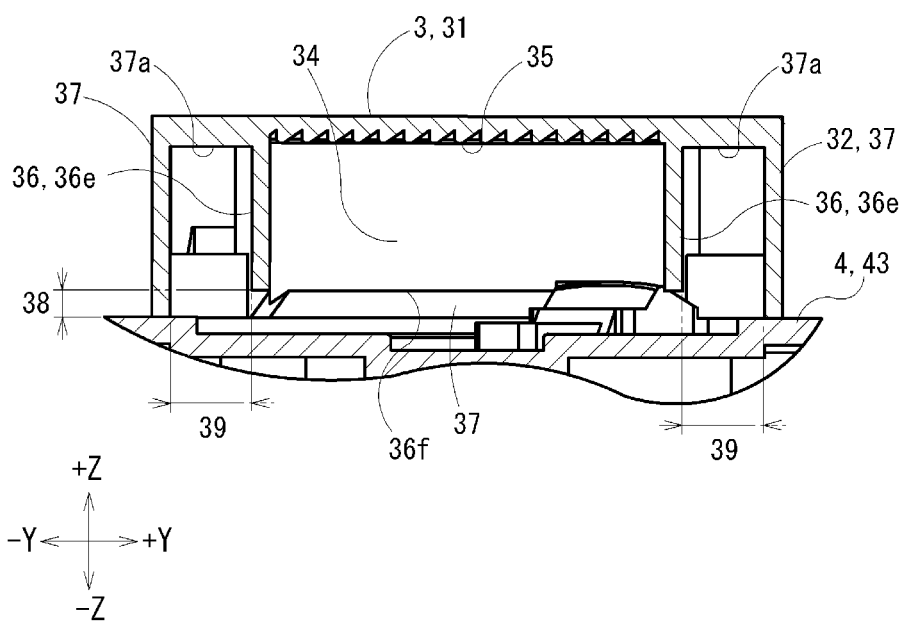
FIG. 30 is an enlarged view of a part around an area E of FIG. 29.

Next, a description will be given of the configuration of the labyrinth 32 of the detector cover 3. FIG. 27 is a plan view illustrating a state in which the detector cover (insect screen is not illustrated) is attached to the detector body, and FIG. 28 is a side view illustrating the state in which the detector cover (insect screen is not illustrated) is attached to the detector body. FIG. 29 is a cross-sectional view taken along D-D line of FIG. 27, and FIG. 30 is an enlarged view of a part around an area E of FIG. 29. As illustrated in FIG. 15, FIG. 17, FIG. 19, FIG. 20, FIG. 29, and FIG. 30, the labyrinth 32 includes the inner labyrinth 36 and the outer labyrinth 37.

Configuration—Details of Configuration of Detector Cover—Labyrinth—Inner Labyrinth The inner labyrinth 36 is a light shielding unit that covers the outer edge of the detection space 34 substantially along the height direction (Z direction). As illustrated in FIG. 15 and FIG. 17, the inner labyrinth 36 is formed of a rectangular ring (specifically, a square ring), and specifically includes a first side piece 36a and a second side piece 36b located on the light emitting unit 52 side (right side of FIG. 17) and a third side piece 36c and a fourth side piece 36d located on the light receiving unit 53 side (left side of FIG. 17) (more specifically, each of the side pieces is formed of a smooth plate-shaped body). The first side piece 36a is connected to the second side piece 36b and the third side piece 36c, and the fourth side piece 36d is connected to the second side piece 36b and the third side piece 36c (the first side piece 36a, the second side piece 36b, the third side piece 36c, and the fourth side piece 36d are simply referred to as a "side piece 36e" when it is unnecessary to particularly distinguish the side pieces). Further, the inner labyrinth 36 is provided such that one of end portions on an open side in the inner labyrinth 36 (an upper end portion of the inner labyrinth 36 illustrated in FIG. 19) comes into contact with the ceiling plate 31.

In addition, as illustrated in FIG. 15, FIG. 19, and FIG. 20, the inner labyrinth 36 has a first inner inflow opening 36f. The first inner inflow opening 36f is a first opening for allowing gas to flow into the detection space 34. As illustrated in FIG. 15, FIG. 19, and FIG. 20, the first inner inflow opening 36f is an opening at an open side end portion in the inner labyrinth 36 (lower end portion of the inner labyrinth 36 illustrated in FIG. 19) and a planar shape thereof is formed in a rectangular shape.

Here, a size and an installation position of the first inner inflow opening 36f are arbitrary.

However, in the embodiment, the size and the installation position are set so that gas can flow into a center of the detection space 34. Specifically, as illustrated in FIG. 15, FIG. 17, FIG. 19, and FIG. 20, the size of the first inner inflow opening 36f is set to a size slightly smaller than an outer shape of the lower end portion of the inner labyrinth 36. In addition, as illustrated in FIG. 15, FIG. 17, FIG. 19, and FIG. 20, the installation position of the first inner inflow opening 36f is set to a position at which a center point of the first inner inflow opening 36f coincides with a center of the detection space 34 in an imaginary XY plane. In addition, as for installation positions of the first inner inflow opening 36f and the detector body 4, in the embodiment, the detector body 4 is disposed at a position at which ambient light can be prevented from directly entering the detector body 4 through the first inner inflow opening 36f. Specifically, as illustrated in FIG. 30, the detector body 4 is disposed at a position facing the first inner inflow opening 36f and at a position separated from the first inner inflow opening 36f by a first gap 38. More specifically, the detector body 4 is disposed such that the bulging portion 43 of the detector body 4 is positioned immediately below the first inner inflow opening 36f with the first gap 38 therebetween. In the embodiment, a height of the first gap 38 is set to a length that allows a desired amount of gas to flow into the detection space 34 via the first inner inflow opening 36f. Specifically, the height may differ depending on the shapes of the inner labyrinth 36, the first inner inflow opening 36f, and the detector body 4, and thus is set based on an experimental result, etc. Details of the configuration of the inner labyrinth 36 will be described below.

Configuration—Details of Configuration of Detector Cover—Labyrinth—Outer Labyrinth In addition, the outer labyrinth 37 covers the first gap 38. As illustrated in FIG. 14, FIG. 15, FIG. 17 to FIG. 20, and FIG. 28 to FIG. 30, the outer labyrinth 37 is formed in a toroidal body that allows the inner labyrinth 36 to be inscribed in the outer labyrinth 37, and provided such that one of open side end portions of the outer labyrinth 37 (upper end portion of the outer labyrinth 37 illustrated in FIG. 19) comes into contact with the ceiling plate 31.

Here, specific configurations of the inner labyrinth 36 and the outer labyrinth 37 have the following features in the embodiment.

First, as a feature related to gas inflow performance that allows smoke to flow into the detection space 34, the outer labyrinth 37 is disposed at a position at which gas outside the detector cover 3 can be inhibited from flowing into the detection space 34 through the first gap 38 and the first inner inflow opening 36f in order without striking the inner labyrinth 36. Specifically, as illustrated in FIG. 19, the outer labyrinth 37 is disposed at a position separated from the first gap 38 by a second gap 39 on an imaginary line HL which is orthogonal to a direction (Z direction) in which the first inner inflow opening 36f and the detector body 4 face each other (that is, imaginary line HL along the horizontal direction) and passes through the first gap 38. More specifically, the outer labyrinth 37 is disposed at a horizontally outer position which is separated from the inner labyrinth 36 by the second gap 39 and at which the entire first gap 38 is covered by the outer labyrinth 37. In the embodiment, a width of the second gap 39 is set to a length that allows a desired amount of gas to flow into the first gap 38 while the outer labyrinth 37 is made compact. Specifically, the width may differ depending on the shapes of the inner labyrinth 36 and the outer labyrinth 37, and thus is set based on an experimental result, etc. According to such a configuration, when gas outside the detector cover 3 flows into the second gap 39 through a second inner inflow opening 37a described below, the gas outside the detector cover 3 is allowed to flow into the first gap 38 after striking the inner labyrinth 36, and thus it is possible to suppress inflow of dust into the detection space 34.

In addition, as a feature related to light shielding performance for inhibiting ambient light from entering the detection space 34, the outer labyrinth 37 is disposed at a position at which ambient light can be inhibited from entering the detection space 34 by the inner labyrinth 36 and the outer labyrinth 37. Specifically, as illustrated in FIG. 19, similarly to the feature related to the gas inflow performance, the outer labyrinth 37 is disposed at a horizontally outer position which is separated from the inner labyrinth 36 by the second gap 39 and at which the entire first gap 38 is covered by the outer labyrinth 37. According to such a configuration, even when light outside the detector cover 3 attempts to enter the detection space 34, this outside light can be blocked by the inner labyrinth 36 or the outer labyrinth 37, and thus ambient light can be inhibited from entering the detection space 34.

In addition, as a feature for further improving the gas inflow performance and the light shielding performance described above, as illustrated in FIG. 19, FIG. 29, and FIG. 30, the inner labyrinth 36 and the outer labyrinth 37 are formed so that the inner labyrinth 36 and the outer labyrinth 37 overlap each other along a direction (horizontal direction) orthogonal to a direction (Z direction) in which the inner inflow opening 36f and the detector body 4 face each other. Specifically, the inner labyrinth 36 and the outer labyrinth 37 are formed so that an entire portion of the outer labyrinth 37 other than a portion facing the first gap 38 overlaps the inner labyrinth 36. According to such a configuration, in a case in which gas outside the detector cover 3 flows into the second gap 39 through the second inner inflow opening 37a described below, the gas is allowed to reliably strike the inner labyrinth 36 when compared to a case in which the inner labyrinth 36 and the outer labyrinth 37 are not formed to overlap each other, and thus it is possible to further inhibit dust from flowing into the detection space 34. In addition, even when light outside the detector cover 3 attempts to enter the detection space 34, the outside light can be reliably shielded by the inner labyrinth 36 or the outer labyrinth 37 when compared to a case in which the inner labyrinth 36 and the outer labyrinth 37 are not formed to overlap each other, and thus it is possible to further inhibit ambient light from entering the detection space 34.

Furthermore, as a feature for increasing the amount of gas flowing into the detection space 34, as illustrated in FIG. 14, FIG. 15, FIG. 18, FIG. 19, and FIG. 28 to FIG. 30, a plurality of second inner inflow openings 37a is formed in a portion in which the inner labyrinth 36 and the outer labyrinth 37 overlap each other (more specifically, a portion of the outer labyrinth 37 overlapping the inner labyrinth 36). Here, the second inner inflow opening 37a is a second opening for allowing gas outside the detector cover 3 to flow into the second gap 39. A shape of the second inner inflow opening 37a is arbitrary. In the embodiment, the shape is set to a shape that allows strength of the outer labyrinth 37 to be ensured. Specifically, as illustrated in FIG. 14, FIG. 15, FIG. 18, and FIG. 19, a width of the second inner inflow opening 37a is set to be shorter than a width of each side piece 36e of the inner labyrinth 36, and a height of the second inner inflow opening 37a is set to be substantially the same as or lower than a height of the portion of the outer labyrinth 37 overlapping the inner labyrinth 36. In addition, an installation position of the second inner inflow opening 37a is arbitrary. In the embodiment, the installation position is set to a position at which gas from the horizontal direction can flow into the second gap 39. Specifically, as illustrated in FIG. 15, FIG. 19, and FIG. 30, the installation position is set to a portion facing each side piece 36e of the inner labyrinth 36 in the portion of the outer labyrinth 37 overlapping the inner labyrinth 36 (more specifically, two second inner inflow openings 37a are provided in the portion facing each side piece 36e of the inner labyrinth 36). According to such a configuration, gas outside the detector cover 3 is allowed to flow into the detection space 34 through the second inner inflow opening 37a, the second gap 39, the first gap 38, and the first inner inflow opening 36f in order. In particular, since the shape of the second inner inflow opening 37a can be set according to a shape of the portion of the outer labyrinth 37 overlapping the inner labyrinth 36, it is possible to increase the amount of gas flowing into the detection space 34.

In addition, a method of forming the detector cover 3 configured in this way is arbitrary. In the embodiment, the detector cover 3 is formed such that a structure of the detector body 4 is simplified. Specifically, as illustrated in FIG. 19, FIG. 29, and FIG. 30, the ceiling plate 31, the inner labyrinth 36, and the outer labyrinth 37 are mutually integrally formed, and the detector body 4 is separately formed from the inner labyrinth 36, the outer labyrinth 37, and the ceiling plate 31. In this case, a connection method between the detector cover 3 and the detector body 4 is arbitrary. In the embodiment, it is desirable to adopt a method that allows connection without using a connection member such as a screw. Specifically, by inserting a fitting piece 37b illustrated in FIG. 18 formed on a lower end portion of the outer labyrinth 37 into a fitting hole (not illustrated) formed in the bulging portion 43 of the detector body 4, the detector cover 3 is detachably connected to the detector body 4. According to such a formation method, when compared to a case in which the detector body 4 and the inner labyrinth 36 (or the outer labyrinth 37) are mutually integrally formed, it is possible to simplify the structure of the detector body 4, and to improve manufacturability of the detector body 4.

A design parameter for determining the light shielding performance (for example, installation angles, heights, etc. of the inner labyrinth 36 and the outer labyrinth 37) and a design parameter for determining the gas inflow performance (for example, the height of the first gap 38, the width of the second gap 39, etc.) can be separated from each other by the detector cover 3 described above. Thus, a degree of freedom in design of the detector cover 3 can be improved when compared to a conventional technology.

Configuration—Action of Detector Cover

Next, an action of the detector cover 3 configured as described above will be described.

The action of the detector cover 3 is roughly divided into an action of causing gas to flow into the detection space 34 (hereinafter, referred to as a "gas inflow action") and an action of inhibiting ambient light from entering the detection space 34 (light shielding action).

Configuration—Action of Detector Cover—Gas Inflow Action

Figure 31:
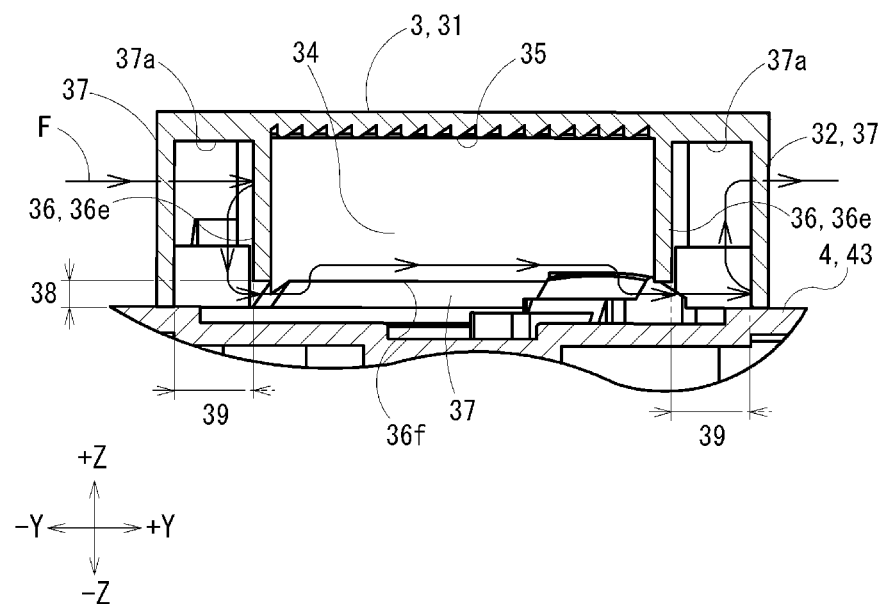
FIG. 31 is a diagram illustrating a flow of gas in FIG. 30.

First, the gas inflow action will be described. FIG. 31 is a diagram illustrating a flow of gas in FIG. 30. An arrow F of FIG. 31 indicates a direction in which gas containing smoke flows based on a result of a predetermined experiment or simulation. In addition, the alarm device 100 can guide gas moving along the installation surface 900 from every direction outside the case 2 to the inside of the alarm device 100 and to the detection space 34. Here, for example, a description will be given of a case in which gas guided to the inside of the alarm device 100 is guided to the detection space 34 along the arrow F of FIG. 31.

As illustrated in FIG. 31, first, gas outside the detector cover 3 guided to the inside of the alarm device 100 flows into the second gap 39 through the second inner inflow opening 37a located on the left side of FIG. 31. Subsequently, when gas flowing into the second gap 39 strikes the inner labyrinth 36, a flow direction of the gas changes from the horizontal direction to a downward direction. In this way, the gas is guided to the lower side along the second gap 39. In this case, since at least a part of dust contained in the gas flowing into the second gap 39 is dropped downward by striking the inner labyrinth 36 and stays in a lower end portion of the second gap 39, it is possible to inhibit the dust from flowing into the detection space 34. Subsequently, the gas guided to the lower side moves through the second gap 39 substantially along the downward direction, and then flows into the first gap 38. Subsequently, the gas flowing into the first gap 38 moves through the first gap 38 substantially along the horizontal direction, and then the gas flows into the detection space 34 through the first inner inflow opening 36*f*. Subsequently, the gas flowing into the detection space 34 moves inside the detection space 34, and then the gas flows out to the first gap 38 through the first inner inflow opening 36*f*. Subsequently, the gas flowing out to the first gap 38 moves through the first gap 38 substantially along the horizontal direction, and when the gas strikes the outer labyrinth 37, a flow direction of the gas changes from the horizontal direction to an upward direction, thereby the gas is guided to the upper side along the second gap 39. Subsequently, the gas guided to the upper side moves through the second gap 39 substantially along the upward direction, and then the gas flows out to the outside of the outer labyrinth 37 through the second inner inflow opening 37*a* located on the right side of FIG. 31.

By such an action, the gas outside the detector cover 3 can be reliably guided to the detection space 34 through the first inner inflow opening 36*f*, the first gap 38, the second gap 39, and the second inner inflow opening 37*a* in order, and smoke can be detected by the alarm device 100. In addition, when the gas flowing into the second gap 39 strikes the inner labyrinth 36, dust contained in the gas can be shaken off, and thus an inflow of dust into the detection space 34 can be suppressed.

Configuration—Action of Detector Cover—Light Shielding Action

Next, the light shielding action will be described. Light outside the detector cover 3 entering the inside of the alarm device 100 is inhibited from entering the detection space 34 by the detector cover 3 and the detector body 4 provided to cover the detection space 34. In particular, since the first gap 38 is covered by the outer labyrinth 37 provided in the detector cover 3, the outside light is inhibited from entering the detection space 34 through the first gap 38 and the first inner inflow opening 36*f* in order. In addition, although the second inner inflow opening 37*a* is provided in the outer labyrinth 37, the second inner inflow opening 37*a* is provided in the portion of the outer labyrinth 37 overlapping the inner labyrinth 36. Thus, even when the outside light enters the second gap 39 through the second inner inflow opening 37*a*, the outside light can be reflected toward the outside of the detector cover 3 after being made incident on the inner labyrinth 36. Therefore, the outside light is inhibited from entering the detection space 34.

Configuration—Details of Configuration of Inner Labyrinth

Figure 32:
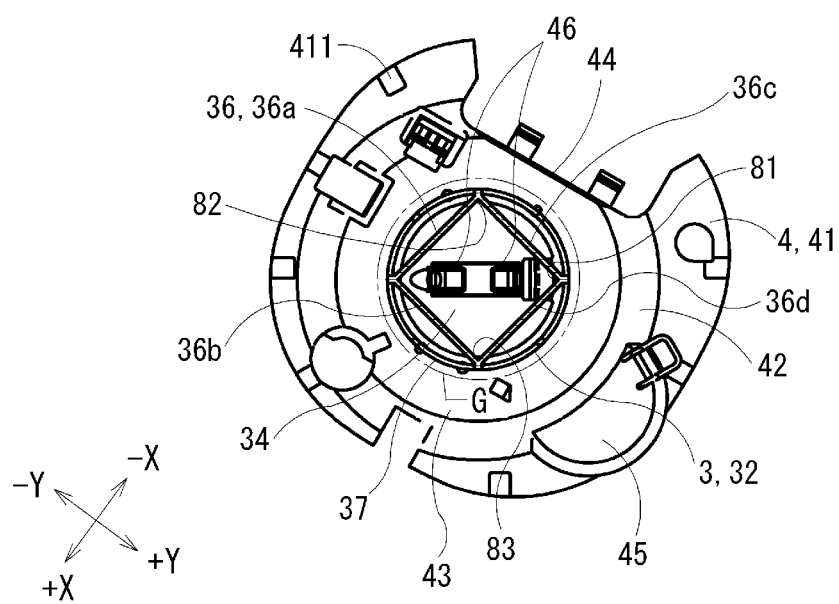
FIG. 32 is a cross-sectional view taken along F-F line of FIG. 28.
Figure 33:
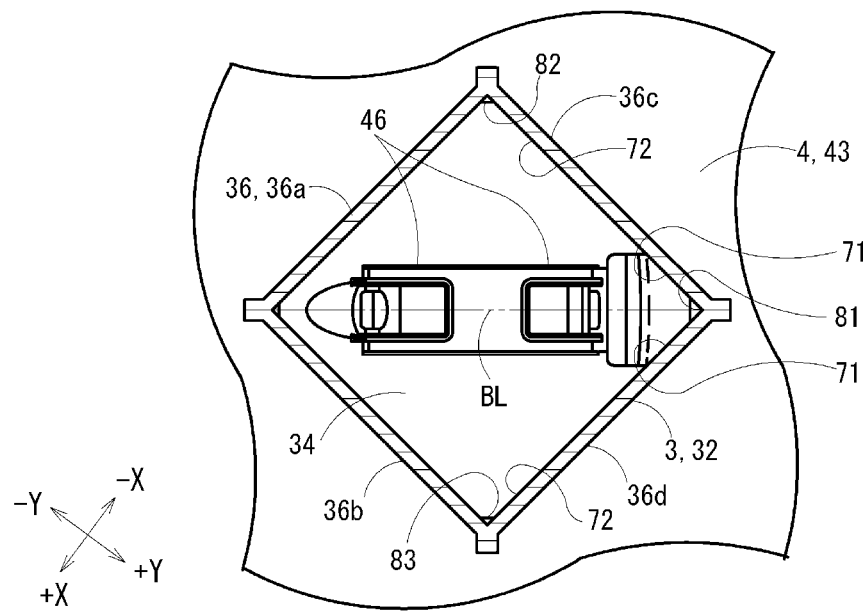
FIG. 33 is an enlarged view of a part around an area G of FIG. 32 (outer labyrinth is not illustrated).
Figure 34:
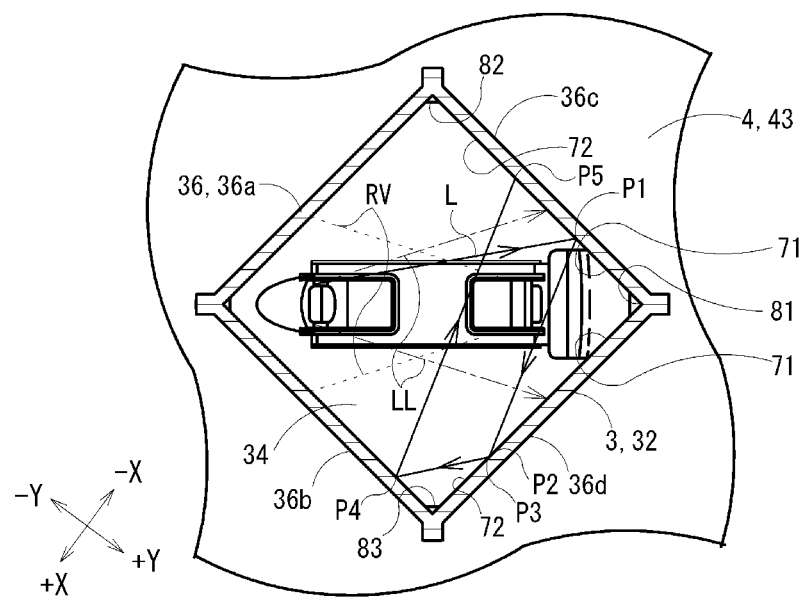
FIG. 34 is a diagram illustrating internal reflection of detection light in FIG. 33.
Figure 35:
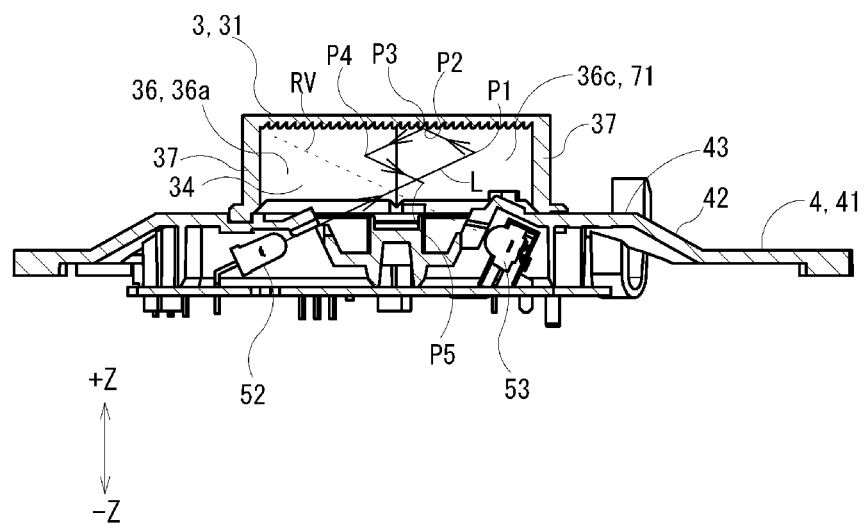
FIG. 35 is a cross-sectional view taken along H-H line of FIG. 27, and is another diagram illustrating internal reflection of detection light.

Next, a description will be given of details of the configuration of the inner labyrinth 36 in the detector cover 3. FIG. 32 is a cross-sectional view taken along F-F line of FIG. 28, and FIG. 33 is an enlarged view of a part around an area G of FIG. 32 (the outer labyrinth 37 is not illustrated). FIG. 34 is a diagram illustrating internal reflection of detection light in the detection space 34 in FIG. 33, and FIG. 35 is a cross-sectional view taken along H-H line of FIG. 27, and is another diagram illustrating internal reflection of detection light. A scheme shown below is applied to the configuration of the inner labyrinth 36 (mainly, the shape of the inner labyrinth 36).

In the embodiment, at least a part of a side surface of the inner labyrinth 36 on the detection space 34 side is formed in a flat shape capable of inhibiting detection light reflected by the inner labyrinth 36 from entering a field of view RV of the light receiving unit 53 in the detection space 34 (a dotted line part illustrated in FIG. 34 and FIG. 35, hereinafter, simply referred to as a "field of view RV"). Here, the "field of view RV" refers to a portion corresponding to a range of view in which light can be received by the light receiving unit 53 in a portion of the detection space 34. In the embodiment, as illustrated in FIG. 34, detection light radiated from the light emitting unit 52 is described as having a predetermined width, which widens as a distance from the light emitting unit 52 increases.

Specifically, a flat shape portion of the inner labyrinth 36 includes a portion 71 (hereinafter referred to as a "first incident portion 71"), on which detection light is directly incident from the light emitting unit 52, in the inner labyrinth 36 and a portion 72 (hereinafter referred to as a "second incident portion 72"), on which detection light is directly incident from the first incident portion 71, in the inner labyrinth 36. In these portions, a vicinity of any one of four corners of the inner labyrinth 36 is formed as the first incident portion 71. More specifically, as illustrated in FIG. 32 and FIG. 33, a vicinity of a corner 81 (hereinafter referred to as a "first corner 81") formed by the third side piece 36*c* and the fourth side piece 36*d* in the inner labyrinth 36 (that is, a portion of each of the third side piece 36*c* and the fourth side piece 36*d* on the first corner 81 side) is formed as the first incident portion 71. In addition, a vicinity of a corner not facing a corner on the first incident portion 71 side among the four corners in the inner labyrinth 36 is formed as the second incident portion 72. More specifically, as illustrated in FIG. 32 and FIG. 33, each of a vicinity of a corner 82 (hereinafter referred to as a "second corner 82") formed by the first side piece 36*a* and the third side piece 36*c* (that is, a portion of the third side piece 36*c* on the second corner 82 side) and a vicinity of a corner 83 (hereinafter referred to as a "third corner 83") formed by the second side piece 36*b* and the fourth side piece 36*d* (that is, a portion of the fourth side piece 36*d* on the third corner 83 side) is formed as the second incident portion 72.

In addition, installation positions of the inner labyrinth 36 and the light emitting unit 52 (or an optical path hole of the element cover 46 on the light emitting unit 52 side) are arbitrary. In the embodiment, the inner labyrinth 36 and the light emitting unit 52 are installed at positions described below. That is, first, the inner labyrinth 36 and the light emitting unit 52 (or the optical path hole of the element cover 46 on the light emitting unit 52 side) are disposed such that detection light directly incident on the first incident portion 71 from the light emitting unit 52 is reflected toward the second incident portion 72. Specifically, as illustrated in FIG. 33 and FIG. 34, the inner labyrinth 36 and the light emitting unit 52 (or the optical path hole of the element cover 46 on the light emitting unit 52 side) are disposed such that when detection light radiated from the light emitting unit 52 is directly incident on a portion of the third side piece 36*c* on the first corner 81 side corresponding to the first incident portion 71 (for example, an incident point P1 of FIG. 34 described below, etc.), the incident detection light is reflected toward a portion of the fourth side piece 36*d* on the third corner 83 side corresponding to the second incident portion 72 (for example, an incident point P2 of FIG. 34 described below, etc.). In addition, the inner labyrinth 36 and the light emitting unit 52 (or the optical path hole of the element cover 46 on the light emitting unit 52 side) are disposed at positions that allow detection light directly radiated from the light emitting unit 52 to be evenly incident on the first incident portion 71 of each of the third side piece 36*c* and the fourth side piece 36*d*. Specifically, as illustrated in FIG. 33, the inner labyrinth 36 and the light emitting unit 52 (or the optical path hole of the element cover 46 on the light emitting unit 52 side) are disposed at positions at which a bisector BL that bisects an angle of the first corner 81 overlaps the light emitting unit 52 (or the optical path hole of the element cover 46 on the light emitting unit 52 side) in the imaginary XY plane.

According to such a configuration, when compared to a conventional technology, it is possible to inhibit detection light from entering the field of view RV. Therefore, it is possible to inhibit scattered light (detection light) scattered by particles of smoke present in the field of view RV from being received by the light receiving unit 53, and thus it is possible to maintain detection accuracy of smoke by the alarm device 100. In addition, even when the entire inner labyrinth 36 is formed in a shape of a rectangular ring, incidence of detection light on the field of view RV can be avoided until detection light is reflected at least twice or more by the first incident portion 71 and the second incident portion 72, and thus it is possible to further maintain detection accuracy of smoke by the alarm device 100.

Configuration—Action of Inner Labyrinth

Next, a description will be given of an action of the inner labyrinth 36 configured as described above. Here, an arrow L of FIG. 34 and FIG. 35 illustrates a direction in which detection light travels based on a result of a predetermined simulation.

First, detection light radiated from the light emitting unit 52 is directly incident on the entire first incident portion 71 of the inner labyrinth 36. However, in the incident detection light, detection light directly incident on a portion P1 of the third side piece 36c on the first corner 81 side corresponding to the first incident portion 71 (hereinafter referred to as an "incident point P1") is internally reflected as described below. Specifically, as illustrated in FIG. 34 and FIG. 35, first, detection light incident on the incident point P1 is reflected toward the fourth side piece 36d side. Subsequently, the detection light reflected toward the fourth side piece 36d side incident on a portion P2 of the fourth side piece 36d on the third corner 83 side corresponding to the second incident portion 72 (hereinafter referred to as an "incident point P2") without entering the field of view RV, and then is reflected toward the ceiling plate 31 side. Subsequently, the detection light reflected toward the ceiling plate 31 side enters a vicinity P3 of the incident point P2 of the ceiling plate 31 (hereinafter referred to as an "incident point P3") without entering the field of view RV, and then is reflected toward the second side piece 36b side. Subsequently, the detection light reflected toward the second side piece 36b side enters a portion P4 of the second side piece 36b on the third corner 83 side (hereinafter referred to as an "incident point P4") without entering the field of view RV, and then is reflected toward the third side piece 36c side. Subsequently, the detection light reflected toward the third side piece 36c side enters a portion P5 of the third side piece 36c on the second corner 82 side (hereinafter referred to as an "incident point P5") without entering the field of view RV.

As described above, when detection light radiated from the light emitting unit 52 is directly incident on the first incident portion 71, the detection light can be repeatedly reflected a plurality of times without the detection light entering the field of view RV. Thus, the detection light can be effectively attenuated. Therefore, even when the light receiving unit 53 receives the detection light repeatedly reflected, the amount of light received by the light receiving unit 53 can be prevented from becoming an excessive amount, and thus it is possible to maintain the detection accuracy of smoke by the alarm device 100.

Assembly Method

Next, a method of assembling the alarm device 100 will be described. First, in FIG. 6, each element is mounted on the circuit board 51 of the circuit unit 5. Specifically, in a state in which the circuit board 51 is disposed and fixed to a predetermined jig, each element is mounted using, for example, a solder, etc.

Subsequently, the detector cover 3 is disposed on the detector body 4. Specifically, the detector cover 3 is press-fitted and disposed in the arrangement recess 431.

Subsequently, the push button 223 and the circuit board 51 are disposed on the front case 22, and the detector body 4 on which the detector cover 3 is disposed is disposed on the front case 22. Specifically, with regard to arrangement of the detector body 4, the light emitting unit 52 and the light receiving unit 53 of the circuit board 51 are appropriately covered by the element cover 46 of the detector body 4, and the positioning recess 441 of the detector body 4 is supported (placed) on the support 225 of the front case 2.

Subsequently, the back case 21 is disposed on the front case 22. Specifically, the component cases 613 and 614 of the back case 21 of FIG. 5 face and come into contact with the screw boss 224 of the front case 22 of FIG. 6 through a through-hole 47 of the detector body 4, and the rib 65 of the back case 21 is provided in the positioning recess 441 of the detector body 4.

Subsequently, the back case 21 is fixed to the front case 22. Specifically, fixing screws 613a and 614a are inserted into insertion holes 613b and 614b communicating with the component cases 613 and 614 of the back case 21, and the component cases 613 and 614 of FIG. 5 and the screw boss 224 of FIG. 6 are screwed together and fixed to each other using the inserted fixing screws 613a and 614a. In this case, the positioning recess 44 of the detector body 4 is interposed and fixed by the support 225 of the front case 2 and the rib 65 of the back case 21, and the outer inflow opening 23 is formed as illustrated in FIG. 3. In this way, assembly of the alarm device 100 is completed.

Installation Method

Next, a method of installing the alarm device 100 will be described. First, the attachment base 1 is attached to the installation surface 900 of FIG. 4. Specifically, the attachment base 1 is attached by screwing the attachment screw to the installation surface 900 through the screw hole 121 of FIG. 6 in a state where the installation surface-side facing surface 12B faces the installation surface 900.

Subsequently, the case 2 of the alarm device 100 of FIG. 4 assembled by the above-described "assembly method" is attached to the attachment base 1. Specifically, the case 2 is attached by engaging the engagement portion 214 of the back case 21 of FIG. 6 with the engagement portion 122 of the attachment base 1 of FIG. 5. In this way, installation of the alarm device 100 is completed.

Effect of Embodiment

As described above, according to the present embodiment, since at least a part of the side surface on the detection space 34 side in the inner labyrinth 36 is formed in a flat shape capable of inhibiting detection light reflected by the inner labyrinth 36 can be inhibited from entering the field of view RV of the light receiving unit 53 in the detection space 34, detection light can be inhibited from entering the field of view RV when compared to a conventional technology. Therefore, since it is possible to inhibit the light receiving unit 53 from receiving detection light scattered by particles of smoke present in the field of view RV, it is possible to maintain the detection accuracy of the smoke by the alarm device 100.

In addition, since the flat shape portion of the side surface of the inner labyrinth 36 on the detection space 34 side includes the first incident portion 71 on which detection light is directly incident from the light emitting unit 52 in the inner labyrinth 36 and the second incident portion 72 on which detection light is directly incident from the first incident portion 71 in the inner labyrinth 36, incidence of detection light on the field of view RV can be avoided until detection light is reflected at least twice or more by the first incident portion 71 and the second incident portion 72, and thus it is possible to further maintain detection accuracy of smoke by the alarm device 100.

In addition, since the entire inner labyrinth 36 is formed in a shape of a rectangular ring, the inner labyrinth 36 can be easily manufactured, and manufacturability of the inner labyrinth 36 can be improved.

In addition, since the vicinity of any one of the four corners in the inner labyrinth 36 is formed as the first incident portion 71 of the flat shape portion, and the vicinity of the corner not facing the corner on the first incident portion 71 side among the four corners in the inner labyrinth 36 is formed as the second incident portion 72 of the flat shape portion, even when the entire inner labyrinth 36 is formed in the shape of the rectangular ring, it is possible to inhibit detection light from entering the field of view RV, and it is possible to maintain detection accuracy of smoke by the alarm device 100.

Modification to Embodiment

Even though the embodiment according to the invention has been described above, a specific configuration and means of the invention can be arbitrarily modified and improved within the scope of the technical idea of each invention described in the claims. Hereinafter, such a modification will be described.

With Regard to Problems to be Solved and Effects of Invention

First, the problems to be solved by the invention and the effects of the invention are not limited to the above contents and may differ depending on the details of the implementation environment and detail configuration of the invention. Further, only some of the problems may be solved, or only some of the effects may be achieved.

With Regard to Dispersion and Integration

In addition, the above-described configurations are functionally conceptual, and may not be physically configured as illustrated. That is, specific forms of dispersion and integration of each part are not limited to the illustrated ones, and all or some thereof can be configured to be functionally or physically dispersed or integrated in an arbitrary unit. For example, the case 2 of the alarm device 100 and the attachment base 1 may be integrally configured, and the integrally configured one may be directly attached to the installation surface of the monitored area.

With Regard to Substance to be Detected

In the embodiment, a description has been given of a case in which the "substance to be detected" is smoke, and the "alarm device" is the "fire alarm (smoke alarm)". However, the invention is not limited thereto. For example, the invention can be applied to a case in which the "substance to be detected" is, for example, a (toxic) gas such as "carbon monoxide" and the "alarm device" is a "gas alarm".

With Regard to Inner Labyrinth

Figure 36:
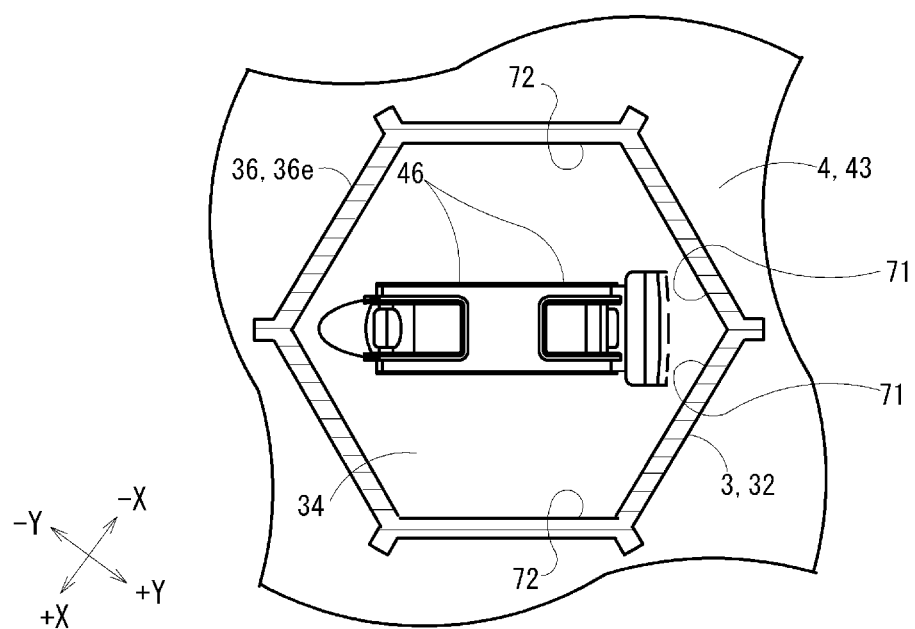
FIG. 36 is a diagram illustrating a modification of a configuration of an inner labyrinth.
Figure 37:
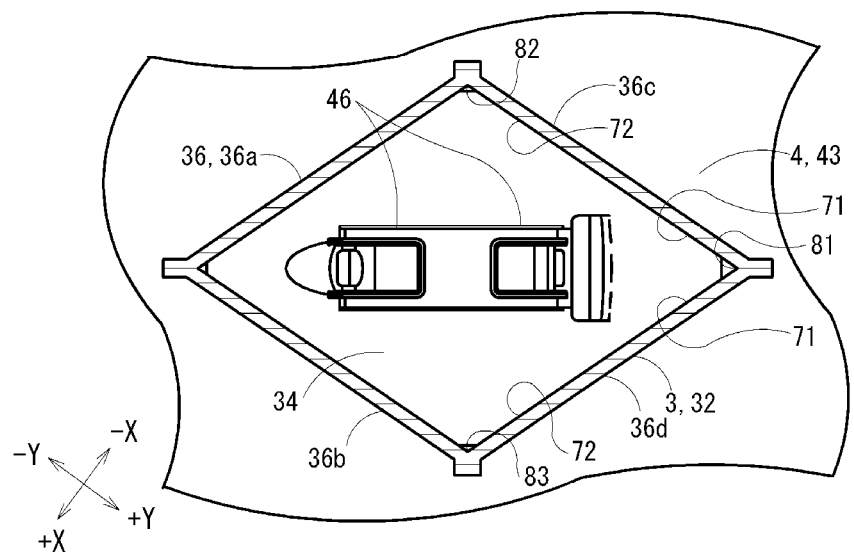
FIG. 37 is a diagram illustrating another modification of the configuration of the inner labyrinth.

The embodiment describes that the inner labyrinth 36 is formed of the rectangular ring. However, the invention is not limited thereto. FIG. 36 and FIG. 37 are diagrams illustrating modifications of the configuration of the inner labyrinth 36. For example, since it is desirable to form the inner labyrinth 36 into a shape according to the needs of the user, the inner labyrinth 36 may be formed of a polygon ring other than the rectangular ring. As an example, the inner labyrinth 36 may be formed of a hexagonal ring, etc. as illustrated in FIG. 36 or a rhombus ring as illustrated in FIG. 37.

In addition, the embodiment describes that the inner labyrinth 36 and the light emitting unit 52 are disposed at the positions at which the bisector BL that bisects the angle of the first corner 81 overlaps the light emitting unit 52 in the imaginary XY plane. However, the invention is not limited thereto. For example, when an installation condition of the light emitting unit 52 is restricted, the inner labyrinth 36 and the light emitting unit 52 may be disposed at positions at which the bisector BL and the light emitting unit 52 do not overlap each other.

In addition, the embodiment describes that the first incident portion 71 and the second incident portion 72 are formed in the inner labyrinth 36. However, the invention is not limited thereto. For example, the portions may be formed in the outer labyrinth 37, the ceiling plate 31, or the bulging portion 43 of the detector body 4.

Figure 38:
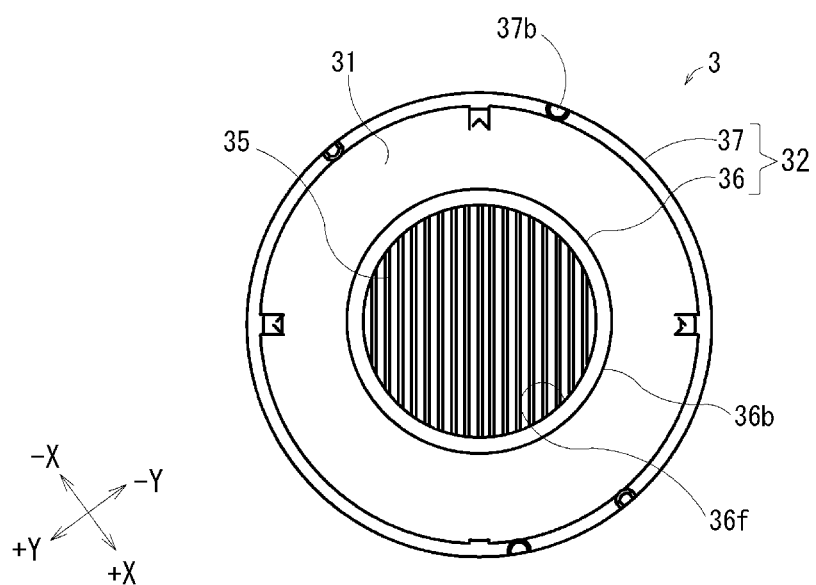
FIG. 38 is a diagram illustrating another modification of the configuration of the inner labyrinth.
Figure 39:
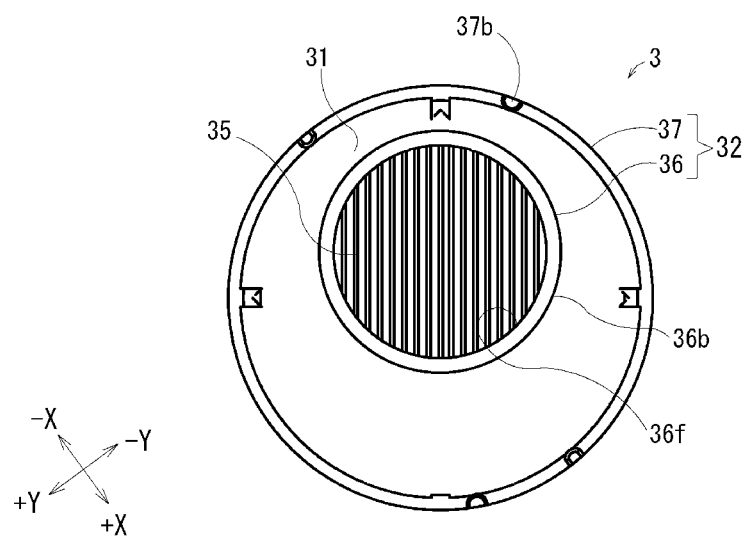
FIG. 39 is a diagram illustrating another modification of the configuration of the inner labyrinth.

In addition, the embodiment describes that the inner labyrinth 36 is formed to be inscribed in the outer labyrinth 37. However, the invention is not limited thereto. FIG. 38 and FIG. 39 are diagrams illustrating other modifications of the configuration of the inner labyrinth 36. For example, as illustrated in FIG. 38 and FIG. 39, the inner labyrinth 36 may be formed not to be inscribed in the outer labyrinth 37. In this case, the inner labyrinth 36 and the outer labyrinth 37 formed of a toroidal body may be arranged in a concentric circle as illustrated in FIG. 38 or arranged in a non-concentric circle (that is, eccentric positions) as illustrated in FIG. 39.

With Regard to Outer Labyrinth

The embodiment describes that the outer labyrinth 37 is formed of the toroidal body.

Figure 40:
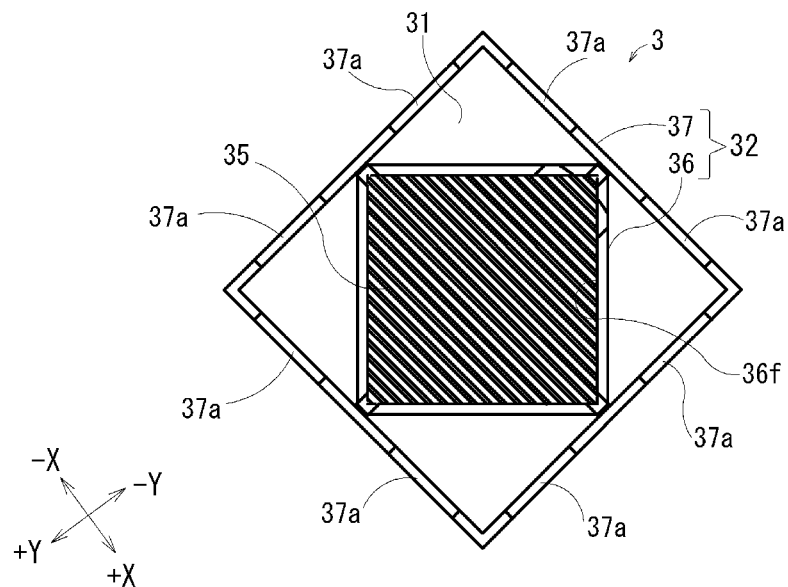
FIG. 40 is a diagram illustrating a modification of a configuration of the outer labyrinth.
Figure 41:
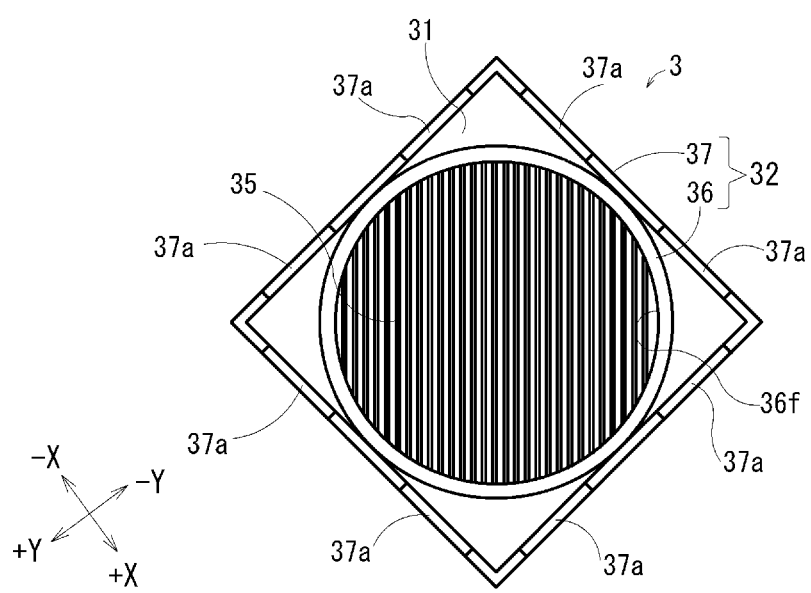
FIG. 41 is a diagram illustrating a modification of the configuration of the inner labyrinth and a modification of the configuration of the outer labyrinth.

However, the invention is not limited thereto. FIG. 40 is a diagram illustrating a modification of the configuration of the outer labyrinth 37. FIG. 41 is a diagram illustrating a modification of the configuration of the inner labyrinth 36 and a modification of the configuration of the outer labyrinth 37. For example, as illustrated in FIG. 40 and FIG. 41, the outer labyrinth 37 may be formed of a rectangular annular body having a plurality of second inner inflow openings 37a. In this case, the inner labyrinth 36 may be formed of a rectangular annular body as illustrated in FIG. 40 or formed of a toroidal body as illustrated in FIG. 41.

One embodiment of the present invention provides an alarm device comprises a detection unit that detects a substance to be detected contained in a gas by radiating detection light toward a detection space for detecting the substance to be detected; and a light shielding unit that inhibits ambient light from entering the detection space, the light shielding unit being provided to cover an outer edge of the detection space, wherein the detection unit includes a light emitting unit that radiates the detection light and a light receiving unit that receives the detection light radiated by the light emitting unit, and at least a part of a side surface of the light shielding unit on a side of the detection space is formed in a flat shape capable of inhibiting the detection light reflected by the light shielding unit from entering a field of view of the light receiving unit in the detection space.

According to this embodiment, since at least at least a part of the side surface of the light shielding unit on a side of the detection space is formed in a flat shape capable of inhibiting the detection light reflected by the light shielding unit from entering a field of view of the light receiving unit in the detection space, detection light can be inhibited from entering the field of view when compared to a conventional technology. Therefore, since it is possible to inhibit the light receiving unit from receiving detection light scattered by particles of smoke present in the field of view, it is possible to maintain the detection accuracy of the smoke by the alarm device.

Another embodiment of the present invention provides the alarm device according to the above embodiment, wherein a flat shape portion of the side surface of the light shielding unit on the side of the detection space includes a first incident portion on which the detection light is directly incident from the light emitting unit in the light shielding unit and a second incident portion on which the detection light is directly incident from the first incident portion in the light shielding unit.

According to this embodiment, since the flat shape portion of the side surface of the light shielding unit on the side of the detection space includes a first incident portion on which the detection light is directly incident from the light emitting unit in the light shielding unit and a second incident portion on which the detection light is directly incident from the first incident portion in the light shielding unit, incidence of detection light on the field of view can be avoided until detection light is reflected at least twice or more by the first incident portion and the second incident portion, and thus it is possible to further maintain detection accuracy of smoke by the alarm device.

Another embodiment of the present invention provides the alarm device according to the above embodiment, wherein a whole of the light shielding unit is formed in a shape of a polygon ring.

According to this embodiment, since a whole of the light shielding unit is formed in a shape of a polygon ring, the light shielding unit can be manufactured according to the needs of the user, and manufacturability of the light shielding unit can be improved.

Another embodiment of the present invention provides the alarm device according to the above embodiment, wherein the whole of the light shielding unit is formed in a shape of a rectangular ring.

According to this embodiment, since the whole of the light shielding unit is formed in a shape of a rectangular ring, the light shielding unit can be easily manufactured, and manufacturability of the light shielding unit can be further improved.

Another embodiment of the present invention provides the alarm device according to the above embodiment, wherein a whole of the light shielding unit is formed in a shape of a rectangular ring, a vicinity of any one of four corners in the light shielding unit is formed as the first incident portion of the flat shape portion, and a vicinity of a corner not facing a corner on a side of the first incident portion among the four corners in the light shielding unit is formed as the second incident portion of the flat shape portion.

According to this embodiment, since a vicinity of any one of four corners in the light shielding unit is formed as the first incident portion of the flat shape portion, and a vicinity of a corner not facing a corner on a side of the first incident portion among the four corners in the light shielding unit is formed as the second incident portion of the flat shape portion, even when the entire light shielding unit is formed in the shape of the rectangular ring, it is possible to inhibit detection light from entering the field of view, and it is possible to maintain detection accuracy of smoke by the alarm device.

REFERENCE SIGNS LIST

1 Attachment base
2 Case
3 Detector cover
4 Detector body
5 Circuit unit
11 Attachment hook
12 Main body
12A Case-side facing surface
12B Installation surface-side facing surface
21 Back case
22 Front case
23 Outer inflow opening
31 Ceiling plate
31a Arrow
32 Labyrinth
33 Insect screen
34 Detection space
35 Light trap
36 Inner labyrinth
36a First side piece
36b Second side piece
36c Third side piece
36d Fourth side piece
36e Side piece
36f First inner inflow opening
37 Outer labyrinth
37a Second inner inflow opening
37b Fitting piece
38 First gap
39 Second gap
41 Flange portion
42 Inclined portion
43 Bulging portion
44 Detector body notch portion
45 Speaker accommodation portion
46 Element cover
47 Through-hole
51 Circuit board
52 Light emitting unit
53 Light receiving unit
54 Shield
55 Switch
65 Rib
71 First incident portion
72 Second incident portion
81 First corner
82 Second corner
83 Third corner
100 Alarm device
111 Screw hole
121 Screw hole
122 Engagement portion
211 Back case-side facing wall
211a Guiding recess
212 Back case-side outer circumferential wall
213a Slit
213b Slit
214 Engagement portion
221 Front case-side exposed wall
222 Front case-side outer peripheral wall
222a Front case-side end portion
223 Push button
224 Screw boss
225 Support
400a Detector body-side end portion 411 Positioning recess
431 Arrangement recess
611 Component case
612 Component case
613 Component case
613a Fixing screw
613b Insertion hole
614 Component case
614a Fixing screw
614b Insertion hole
615 Component case
616 Component case
621 Short fin
622 Short fin
623 Short fin
631 Long fin
632 Long fin
641 Prevention piece
642 Prevention piece
651 Rib
652 Rib
653 Rib
654 Rib
655 Rib
656 Rib
657 Rib
658 Rib
659 Rib
900 Installation surface
CN1 Power supply connector
BL Bisector
HL Imaginary line
F Arrow
L Arrow
LL Radiation range of detection light
P1 to P6 Incident point
RV Field of view

What is claimed is:

1. An alarm device comprising:
    a detection unit that detects a substance to be detected contained in a gas by radiating a detection light toward a detection space for detecting the substance to be detected; and
    a light shielding unit that inhibits ambient light from entering the detection space, the light shielding unit being provided to cover an outer edge of the detection space, wherein the light shielding unit includes at least two light shielding walls,
    wherein the detection unit includes a light emitting unit that radiates the detection light and a light receiving unit that receives the detection light radiated by the light emitting unit, wherein a first corner is formed by intersecting the at least two light shielding walls so that the light receiving unit is positioned between the corner and the light emitting unit, and
    at least a part of a side surface of the light shielding unit on a side of the detection space is formed in a flat shape capable of inhibiting the detection light reflected by the light shielding unit from entering a field of view of the light receiving unit in the detection space, wherein the light emitting unit radiates the detection light toward the first corner so that the detection light illuminates the first corner.

2. The alarm device according to claim 1, wherein a flat shape portion of the side surface of the light shielding unit on the side of the detection space includes a first incident portion on which the detection light is directly incident from the light emitting unit in the light shielding unit and a second incident portion on which the detection light is directly incident from the first incident portion in the light shielding unit.

3. The alarm device according to claim 1, wherein a whole of the light shielding unit is formed in a shape of a polygon ring.

4. The alarm device according to claim 3, wherein the whole of the light shielding unit is formed in a shape of a rectangular ring.

5. The alarm device according to claim 2,
    wherein a whole of the light shielding unit is formed in a shape of a rectangular ring,
    a vicinity of any one of four corners, including at least the first corner, in the light shielding unit is formed as the first incident portion of the flat shape portion, and
    a vicinity of a corner not facing a corner on a side of the first incident portion among the four corners in the light shielding unit is formed as the second incident portion of the flat shape portion.

* * * * *